United States Patent
Kogai et al.

[11] Patent Number: 6,145,180
[45] Date of Patent: Nov. 14, 2000

[54] METHOD AND SYSTEM FOR THE ASSEMBLY OF WORKS AND METHOD FOR THE ASSEMBLY OF AUTOMOTIVE VEHICLES

[75] Inventors: Masamiti Kogai; Nobuo Kihara; Masahiro Osumi; Masakatsu Ohsugi; Yoshikazu Fujioka; Seikichi Yamamoto; Naoyuki Ikemizu, all of Hiroshima-ken, Japan

[73] Assignee: Mazda Motor Corporation, Hiroshima-Ken, Japan

[21] Appl. No.: 08/261,252

[22] Filed: Jun. 14, 1994

Related U.S. Application Data

[63] Continuation of application No. 07/814,563, Dec. 30, 1991, abandoned.

[30] Foreign Application Priority Data

| Dec. 28, 1990 | [JP] | Japan | 2-408549 |
| Dec. 28, 1990 | [JP] | Japan | 2-408551 |
| Jan. 30, 1991 | [JP] | Japan | 3-009446 |
| Jan. 30, 1991 | [JP] | Japan | 3-009448 |
| Mar. 5, 1991 | [JP] | Japan | 3-038624 |
| Mar. 25, 1991 | [JP] | Japan | 3-059951 |

[51] Int. Cl.$^7$ .................................................. B21D 39/00
[52] U.S. Cl. ............................... 29/429; 29/430; 29/431; 29/822; 29/823; 29/824
[58] Field of Search ................................ 901/41; 29/429, 29/430, 431, 784, 791, 794, 795, 799, 822, 823, 824

[56] References Cited

U.S. PATENT DOCUMENTS

| 4,589,184 | 5/1986 | Asano et al. ........................ 29/791 X |
| 4,669,168 | 6/1987 | Tamura et al. ........................ 29/429 |
| 4,674,181 | 6/1987 | Hamada et al. ...................... 29/431 X |
| 4,781,519 | 11/1988 | Monforte ............................. 901/41 X |
| 4,977,667 | 12/1990 | Sekimoto et al. ...................... 29/784 |

FOREIGN PATENT DOCUMENTS

| 60-33173 | 2/1985 | Japan ...................................... 29/469 |
| 0056283 | 3/1989 | Japan ...................................... 29/429 |

*Primary Examiner*—Joseph M. Gorski
*Attorney, Agent, or Firm*—Morrison & Foerster LLP

[57] ABSTRACT

A vehicle assembly line has a first line for a first mobile conveyor and a second line for a second mobile conveyor and the first line is connected to the second line with two hanger conveyor lines. Two working robots are disposed to the first mobile conveyor, one being positioned within a cabin of an upper body section and the other being positioned in front of the upper body section. The second mobile conveyor has a mechanism for altering a posture of the upper body section and a height position thereof. To the upper body section are mounted various small parts such as grommets with the first working robot during the course of running the first mobile conveyor in the first line. The second line has plural stations for mounting larger parts such as bumpers to the upper body section which is loaded on the second mobile conveyor and whose posture and position are aligned with the working robots disposed in the plural stations before entering the stations. The upper body section is conveyed again to the first line in which the upper vehicle body section is mounted with various parts and the various parts are fastened with bolts tightly, followed by mounting seats, etc. Then, lower parts such as an engine and suspension are mounted to the assembled vehicle body section.

7 Claims, 20 Drawing Sheets

STATION UDS

METHOD AND SYSTEM FOR THE ASSEMBLY OF WORKS AND METHOD FOR THE ASSEMBLY OF AUTOMOTIVE VEHICLES

This application is a continuation of U.S. application Ser. No. 07/814,563, filed Dec. 30, 1991, now abandoned.

BACKGROUND OF THE INVENTION

1. Field of the Invention

The present invention relates to a method and a system for the assembly of works and a method for the assembly of automotive vehicles. More particularly, the invention relates to methods and systems suitable for automations the assembly line for assembling automotive vehicles.

2. Description of the Related Art

The assembly line for automotive vehicles is roughly broken down into a white vehicle body assembly line, a coating line and a vehicle body assembly line.

The white body assembly line is to assemble a white vehicle body section temporarily with doors, an engine hood, a trunk lid and so on, prior to coating. In the coating line, the resulting white vehicle body section is coated with a sealing agent and then with undercoating, intermediate coating and overcoating paints, as needed. After coating, the parts such as the doors, the engine hood, the trunk lid and so on are detached from the coated vehicle body section, and each of the parts is transferred and conveyed to the corresponding working lines.

In each of the working lines, various parts, members or units are mounted to the vehicle body sections, doors, engine hoods, trunk lids and so on, and the working lines constitute part of the vehicle assembly line. After the various parts have been mounted to the vehicle body section, the doors, the engine hood, the trunk lid and so on in the corresponding working lines, then the doors, the engine hood, the trunk lid and other members are mounted to the vehicle body section. Further, lower parts such as exhaust system members, suspension members and so on to be mounted to the floor rear bottom of the vehicle body section in the vehicle body assembly line.

In the working lines, the vehicle body sections are loaded on and conveyed by conveyors or carriages or supported by hanger conveyors and the parts, members, units and so on are mounted to the vehicle body sections with the aid of working robots or by manual operations.

Japanese Utility Model Laid-open Publication (kokai) No. 62-108,183 and Japanese Patent Laid-open Publication (kokai) No. 63-265,779 disclose procedures in which the vehicle body section is divided into an upper vehicle body section and an under vehicle body section containing a floor. To each of the upper vehicle body section and the under vehicle body section are mounted various parts in respective working lines, and then the upper vehicle body section is assembled with the under vehicle body section. These procedures are suitable for the automation of the assembly of the automotive vehicles.

In mounting the various parts to the upper vehicle body section, a plurality of working robots are disposed in the assembly line and the upper vehicle body section is conveyed to the working robots which mount the parts to the upper vehicle body section.

These procedures, however, present problems and suffer from disadvantages in supplying various parts to the working robots disposed in the assembly line for mounting them to the upper vehicle body section.

It is difficult to align the upper vehicle body section with the working robots. When the upper vehicle body section is conveyed, for example, with a conveyor or carriage, the conveyor or carriage should be suspended in a predetermined position in the station where the working robot is disposed. If there would be a deviation in the actual position where the conveyor or carriage has been suspended from the predetermined position, the actual position should be corrected prior to the start of the mounting operations for mounting the parts. In particular, when the conveyor or carriage travels at a high speed, the actual position in which it is suspended may be likely to deviate from the predetermined position or the upper vehicle body section loaded on the conveyor or carriage may be likely to be deviated or departed from its predetermined position during the travelling of the conveyor or carriage. In this case, too, the actual position of the conveyor or carriage and/or the position of the upper vehicle body section, relative to the corresponding working robots, is required to be corrected prior to the start of the mounting operations. Hence, in the conventional assembly line, the conveyors or carriages are needed to travel at a speed as low as possible in order to secure the accurate alignment of the upper vehicle body section with the working robots, however, the low speed of conveying the conveyors or carriages lowers efficiency of mounting the parts to the upper vehicle body sections. The lower the speed at which the conveyors or carriages travel, the lower the efficiency in mounting the parts and eventually the lower the production efficiency.

In the conventional vehicle body assembly lines, the problem arises that the upper vehicle body sections should be conveyed to the working robot intermittently when parts are mounted to the upper vehicle body section with the aid of the working robots which are disposed in the working lines. The working robots should stop working until a fresh upper vehicle body section enters the working station after the working robots have mounted the necessary parts to the previous upper vehicle body section and the previous vehicle body section has departed from the corresponding working stations, when the upper vehicle body section is intermittently conveyed and supplied to the working robot in the working station. As a matter of course, the period of time when the working robots should stop working and wait for the fresh upper vehicle body section is a great factor reducing the working efficiency of the working robots. It is to be noted that this period of time during which the working robots stop working becomes extremely long if the conveyors or carriages are to be conveyed at a low speed.

In addition, the requirements for the correction of the posture or position of the upper vehicle body section relative to the corresponding working robots may exert a great influence upon efficiency in the mounting operations, particularly in mounting large parts such as interior units with the aid of the working robots, for example, to the inside of a cabin section of the upper vehicle body section. If the posture or position of the upper vehicle body section loaded on the conveyor or carriage does not fit to the posture or position of the large parts, it will take a long time to correct the posture or position of the upper vehicle body section relative to the posture or the vertical position of the large part prior to the mounting operations. As a matter of course, a longer period of time for aligning the upper vehicle body section with the large parts impairs the working efficiency of the working robots.

On the other hand, the mounting of the lower parts such as driving system parts including internal combustion engines, exhaust system parts, suspension members and so on requires laborious and time-consuming operations. For example, Japanese Patent Laid-open Publication (kokai) No. 63-265,779 discloses the procedures in which the lower parts in a unit form are mounted to the under vehicle body section and thereafter the under vehicle body section is combined with the upper vehicle body section. When the lower parts are mounted to the under vehicle body section and the resulting under vehicle body section is mounted to the floor member as the upper vehicle body section, however, the lower parts in the unit form attached to the floor member may interfere with the mounting of the under vehicle body section to the upper vehicle body section. Hence, this operation may worsen workability in joining the under vehicle body section with the upper vehicle body section.

SUMMARY OF THE INVENTION

The object of the present invention is to provide a method and a system for the assembly of the vehicle body sections as a work as well as a method for the assembly of automotive vehicles with improved working efficiency in mounting parts, units, system and so on to the work.

In order to achieve the aforesaid object, the present invention provides a method for the assembly of a work in a vehicle body assembly line having a guide rail disposed in a work assembly line for mounting a part to the work with the aid of a working robot and a conveyor or carriage with the work loaded thereon, travelling on and along the guide rail, the conveyor or carriage being provided with the working robot for mounting the part to the work and with alignment means for aligning the work loaded thereon; comprising mounting the part preset on the conveyor or carriage to the work with the aid of the working robot during the course when the conveyor or carriage travels.

In another aspect, the present invention provides a method for the assembly of a work in a vehicle body assembly line having a guide rail disposed in a work assembly line for mounting parts to the work with the aid of a working robot, the work being loaded on a conveyor or carriage so disposed as to be conveyed on and along the guide rail, comprising:

aligning the work loaded on the conveyor or carriage with alignment means disposed thereon; and mounting the part or parts preset on the conveyor or carriage to the work with the aid of the working robot disposed on the conveyor or carriage during the course when the conveyor or carriage is conveyed on and along the guide rail.

Further, the system for the assembly according to the present invention comprises:

a guide rail disposed in a work assembly line for mounting parts to the work;

a conveyor or carriage with the work loaded thereon travelling on and along the guide rail;

a working robot disposed on the conveyor or carriage;

alignment means disposed on the conveyor or carriage for aligning the work loaded thereon; and control means disposed on the conveyor or carriage for mounting the part or parts preset on the conveyor or carriage to the work with the aid of the working robot during the course when the conveyor or carriage travels.

The method and the system according to the present invention having the configuration as described hereinabove can mount the part or parts to the work loaded on the conveyor or carriage and aligned with the part or parts with the aid of the working robot disposed on the conveyor or carriage during the course when the conveyor or carriage is travelling in the work assembly line. Hence, the part or parts can be mounted to the vehicle body section as the work is travelling in the work assembly line, unlike in the conventional work assembly line where the conveyor or carriage is required to be suspended whenever it reaches the positions of the working robots disposed in the working stations. In other words, the method and the system according to the present invention presents no problems with the alignment of the work with the working robots, which have so far been caused in the conventional work assembly line whenever the conveyor or carriage with the work loaded thereon comes to the working stations, because in accordance with the present invention the part or parts can be mounted to the vehicle body section with the working robot disposed on the conveyor or carriage during the course when the work is being conveyed by the conveyor or carriage. Further, unlike the conventional work assembly line, the method and the system according to the present invention do not require the working robots to wait for the entry of the fresh work after the part or parts have been mounted to the previous work and the resulting work has left the position of the working robot, thereby the system avoids losing waiting time of the working robots and improves production efficiency.

On the other hand, another aspect of the present invention provides the system for the assembly of the vehicle body as a work, which comprises:

a first guide rail disposed in a loop-shaped structure in a work assembly line for mounting a part or parts to the work;

a second guide rail disposed in a loop-shaped structure, adjacent the first guide rail, in the work assembly line;

a first conveyor or carriage with the work loaded thereon travelling on and along the first guide rail in or on a work passage line in the work assembly line;

a second conveyor or carriage with the work loaded thereon travelling on and along the second guide rail in or on the work passage line in the work assembly line;

a first hanger conveyor disposed in or on the work passage line for hanging the work loaded on the first conveyor or carriage and transferring the work to the second conveyor or carriage; and a second hanger conveyor disposed in or on the work passage line thereof for hanging the work loaded on the second conveyor or carriage and transferring the work to the first conveyor or carriage;

wherein the work is conveyed from the first conveyor or carriage through the first hanger conveyor, the second conveyor or carriage and the second hanger conveyor to the first conveyor or carriage; and which further comprises:

a first working robot disposed on or to the first conveyor or carriage for mounting a first part loaded on the first conveyor or carriage;

alignment means disposed on or to the first conveyor or carriage for aligning the work loaded on the first conveyor or carriage with the first working robot;

control means disposed on or to the first conveyor or carriage for controlling the first working robot to mount the first part to the work loaded thereon with the aid of the first working robot during the course when the work loaded on the first conveyor or carriage is conveyed on or along the first guide rail;

a mounting station disposed on or to the second guide rail for mounting a second part to the work loaded on the second conveyor or carriage;

a second working robot disposed on or in the mounting station for mounting the second part to the work loaded on the second conveyor or carriage;

position altering means disposed on or to the second conveyor or carriage for altering a position of the work loaded on the second conveyor or carriage in alignment with the second working robot;

a part supply line for supplying the second part to the mounting station; and wherein the second part is mounted in the mounting station with the second working robot to the work loaded on the second conveyor or carriage, which is aligned with the second working robot by altering the position of the work by the position altering means.

This system according to the present invention allows the second part or parts to approach the vehicle body section as the work, whenever the work enters the working station in which the second working robot is disposed, and to be mounted to the work because the position of the work has previously been altered and aligned with the second working robot by the position altering means so as to be suitable for mounting the second part or parts to the work with the aid of the second working robot.

In addition, the method for the assembly of an automotive vehicle according to the present invention, comprises:

a first step for separating a vehicle body section after coating into an upper vehicle body section and an under vehicle body section composed of at least a floor section;

a second step for mounting an interior part to the upper vehicle body section;

a third step for mounting an interior part such as a seat and so on to the upper vehicle body section;

a fourth step for assembling the upper vehicle body section mounted in the second step with the upper vehicle body section mounted in the third step for forming an automotive vehicle body section; and a fifth step for mounting a lower part to be mounted to a bottom surface of the under vehicle body section to the automotive vehicle body section assembled in the fourth step.

This method for the assembly of the automotive vehicle according to the present invention permits the upper vehicle body section to be mounted to the under vehicle body section in the absence of the lower part, which impairs the production efficiency in the conventional vehicle body assembly line, because the lower part is mounted to the under vehicle body section after having been mounted to the upper vehicle body section.

Other objects, features and advantages of the present invention will become apparent in the course of the description of the preferred embodiments, which follows, with reference to the accompanying drawings.

BRIEF DESCRIPTION OF THE DRAWINGS

FIGS. 1 to 11 are directed to a first embodiment of the present invention, in which:

FIG. 1 is a schematic plan view showing an outline of a vehicle body assembly line for mounting automotive vehicles;

FIG. 2 is a perspective view showing a vehicle body section after having been coated with paints;

FIG. 3 is a perspective view showing an upper vehicle body section and an under vehicle body section after having been separated from the vehicle body section coated;

FIG. 4 is an exploded perspective view showing the upper vehicle body section by removing doors, an engine hood and so on from the upper vehicle body section;

FIG. 5 is a side view showing the first conveyor or carriage with the upper vehicle body section loaded thereon;

FIG. 6 is an elevational view showing the first conveyor or carriage with the upper vehicle body section loaded thereon;

FIG. 7 is a perspective view showing the first conveyor or carriage with the upper vehicle body section loaded thereon;

FIG. 8 is a front view in section showing the working robot within a cabin section of the upper vehicle body section loaded on the first conveyor or carriage;

FIG. 9 is a partially cut-away side view showing the second conveyor or carriage;

FIG. 10 is a view showing the detail of a locking mechanism loaded on the second conveyor or carriage; and FIG. 11 is a perspective view showing the position of the upper vehicle body section suitable for mounting a seat belt by rotating the upper vehicle body section loaded on the second conveyor or carriage.

DETAILED DESCRIPTION OF THE PREFERRED EMBODIMENTS

The present invention will be described in detail by ways of examples with reference to the accompanying drawings.

Figure 1:
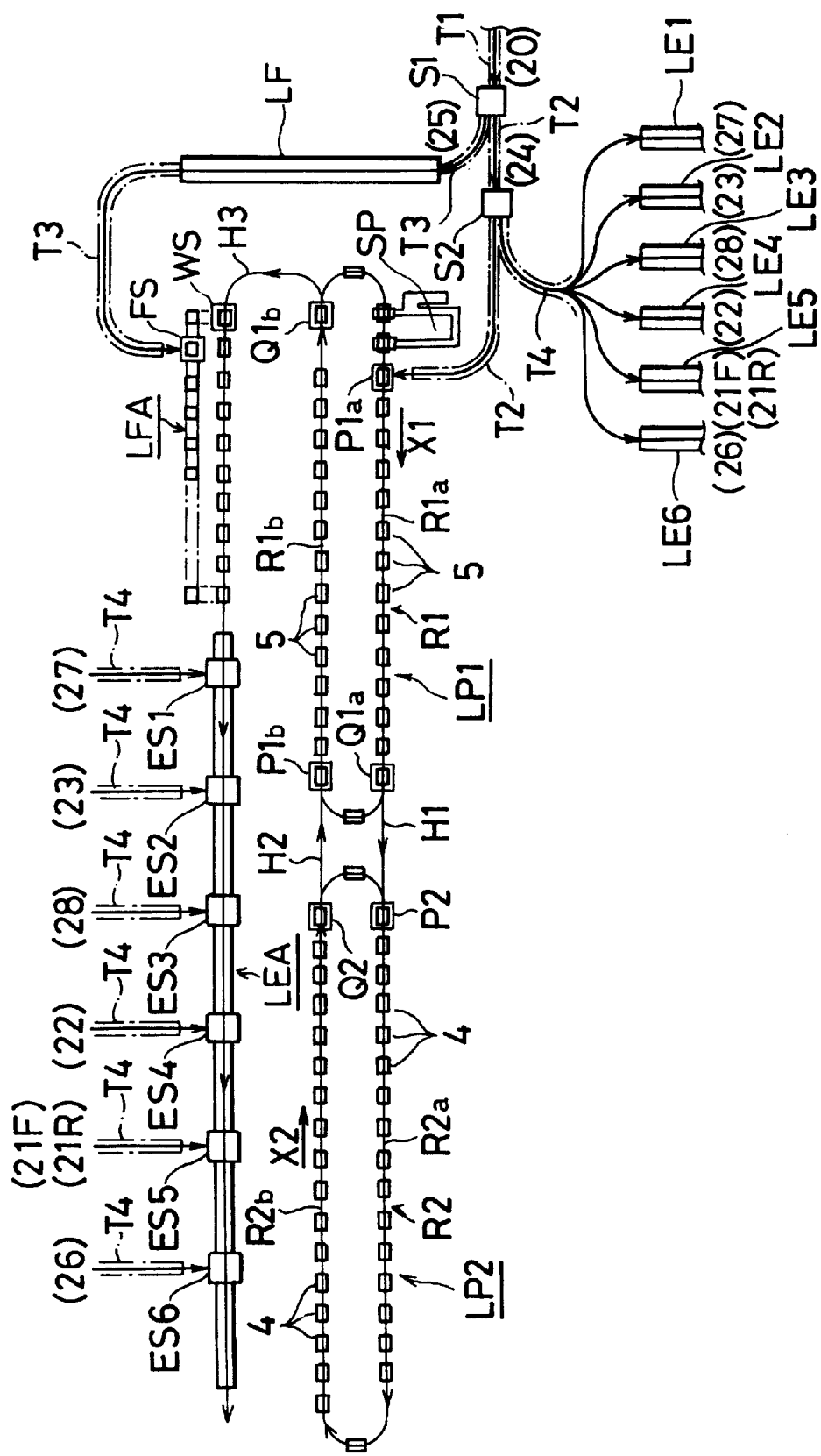

FIG. 1 shows an outline of the vehicle body assembly line according to an embodiment of the present invention.

The vehicle body assembly line as shown in FIG. 1 comprises:

a first vehicle body passage line section T1 through which the vehicle body is conveyed to a first working station S1 from a coating line after having been coated;

a second conveyor passage line section T2 for conveying the upper vehicle body section of the vehicle body section, through which the upper vehicle body section is conveyed to a second working station S2;

a third conveyor passage line section T3 for conveying the floor member as the under vehicle body section, through which the floor member is conveyed to a line section LF for processing the floor member;

fourth conveyor passage line sections T4 for conveying external members;

the line section LF for processing the floor member conveyed from the third conveyor passage line section T3 for conveying the floor member;

first to six branch lines LE1 to LE6 for processing the external members conveyed through the fourth conveyor passage line sections T4 for conveying the external members, respectively;

the first working station S1 for dividing the vehicle body coated into the upper vehicle body section and the floor member as the under vehicle body section;

the second working station S2 for removing various upper vehicle body section members from the upper vehicle body section;

a first working line section LP1 connected to the first vehicle body passage line section T1 for mounting parts disposed on a first conveyor or carriage to the upper vehicle body section loaded thereon;

a second working line section LP2 connected to the first working line section LP1 for mounting parts to the upper vehicle body section transferred from the first conveyor or carriage to a second conveyor or carriage;

a line section LFA for assembling the upper vehicle body section with the floor member, thereby forming an assembled vehicle body section, thereby forming an assembled vehicle body section; and a line section LEA for mounting the external parts to the assembled vehicle body section.

The line section LF for processing the floor member is disposed along the third conveyor passage line section T3 for conveying the floor member to the line section LFA for assembling the floor member with the upper vehicle body section. The first to six branch lines LE1 to LE6 for processing the external members are disposed on and along each of six fourth branched conveyor passages T4 for conveying the external members.

The first working line section LP1 for mounting the parts to the upper vehicle body section has a first work passage line sub-section R1 on and along which a plurality of first mobile conveyors or carriages 5 convey the upper vehicle body section to the second working line section LP2 and to the line section LFA.

On the other hand, the second working line section LP2 for mounting the parts has a second work passage line section R2 on which in turn are disposed a plurality of second mobile conveyors or carriages 4 for conveying the upper vehicle body section.

A terminal end portion of the second conveyor passage line section T2 for conveying the upper vehicle body section is connected to the start end portion of a first work passage sub-section R1a of the first work passage line section R1 and a terminal end portion of the first work passage sub-section R1a of the first work passage line section R1 is connected to the start end portion of a second work passage line sub-section R2a of the second work passage line section R2 through a hanger conveyor H1. Then, a terminal end portion of the second work passage line sub-section R2a of the second work passage line section R2 is connected to a start end portion of a second work passage section line sub-section R2b of the second work passage line section R2 and a terminal end portion of the second work passage line sub-section R2a of the second work passage line section R2 is connected to a start end portion of a first work passage line sub-section R1b of the first work passage line section R1 through a hanger conveyor line H2. Further, a terminal end portion of the first work passage line sub-section R1b of the first work passage line section R1 is connected through a hanger conveyor line H3 to the line section LFA for assembling the upper vehicle body section with the floor members. In other words, both end portions of the first work passage sub-section R1a of the first work passage line section R1 are connected to the both end portions of the first work passage line sub-section R1b of the first work passage line section R1, on the one hand, thereby forming a loop structure. The end portions of the second work passage line sub-section R2a of the second work passage line section R2 are connected to both end portions of the second work passage section line sub-section R2b of the second work passage line section R2, on the other hand, thereby forming a loop structure. Further, the first work passage line section R1 is connected to the second work passage line section R2 at their corresponding end portions, thereby forming another loop structure.

The line section LFA for assembling the upper vehicle body section with the floor member is then connected to the line section LEA for mounting the external parts to the assemble vehicle body section and a terminal end portion of the third conveyor passage line section T3 for conveying the floor member is further connected to the line section LFA for mounting the external members. On the other hand, each of the terminal end portions of six fourth conveyor passages T4 for conveying external members is connected to the line section LEA for mounting the external parts.

Figure 2:
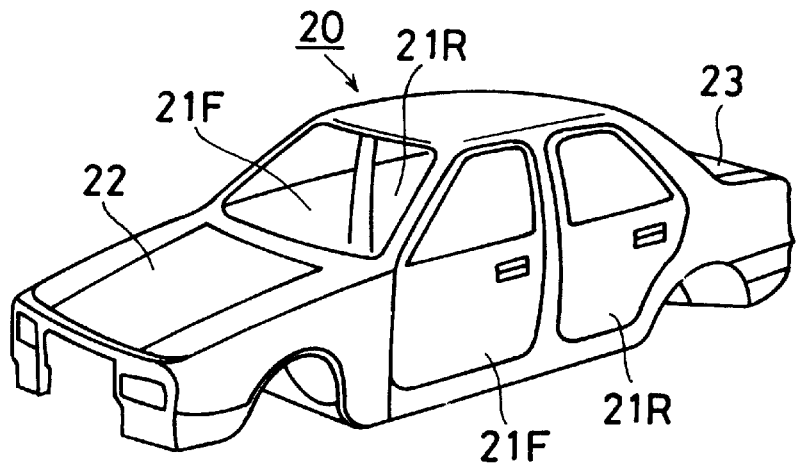

As shown in FIG. 2, a vehicle body 20 is composed of a variety of members for structuring the vehicle body, including exterior members such as a front door 21F, a rear door 21R, an engine hood 22, a trunk lid 23 and so on. The vehicle body 20 is conveyed to the first vehicle body passage line section T1 after it has been coated in a coating line (not shown in the drawing) with a sealing agent and then with various paints including undercoating, intermediate coating and overcoating paints, as needed.

First Working Station S1 (FIG. 1)

As shown in FIG. 1, the first working station S1 is disposed in the terminal position of the first vehicle body passage line section T1 to divide a vehicle body section transferred from the first vehicle body passage line section T1 after the vehicle body section has been coated in a coating line, not shown in the drawing.

Figure 3:
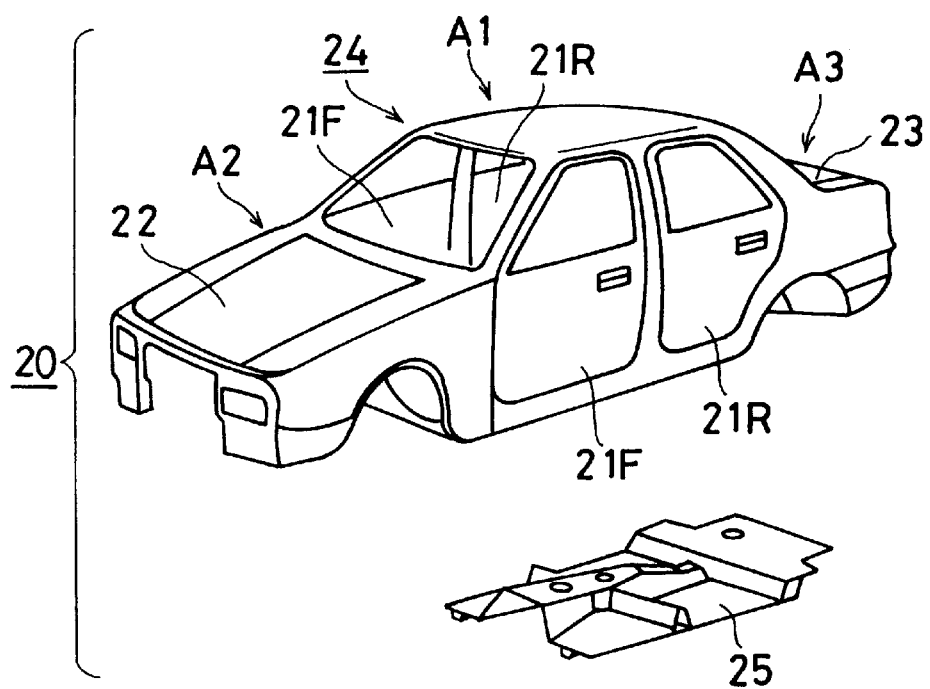

The vehicle body 20 is first conveyed from the first vehicle body passage line section T1 to the first working station S1 and divided into an upper vehicle body section 24 and a floor member 25 as an under vehicle body section, as shown in FIG. 3. The upper vehicle body section 24 is provided with the external members including the front door 21F, the rear door 21R, the engine hood 22, the trunk lid 23 and so on.

The upper upper vehicle body section 24 comprises a cabin section A1, an engine room section A2 located in the front of the cabin section A1, and a trunk room section A3 located in the rear of the cabin section A1. To the cabin section A1 are mounted the front door 21F and the rear door 21R. To the engine room section A2 are mounted the engine hood 22. Further, the trunk lid 23 is mounted to the trunk room section A3. The cabin section A1 of the upper vehicle body section 24 is wide open at its bottom section because the floor member 25 has been removed from the vehicle body 20.

After the division of the vehicle body 20 into the upper vehicle body section 24 and the floor member 25, the upper vehicle body section 24 is conveyed to the second working station S2 disposed in the second conveyor passage line section T2 for conveying the upper vehicle body section to the conveyor passage line section T2. On the other hand, the floor member 25 is conveyed to the third conveyor passage line section T3 for conveying the floor member to the line section LF for processing the floor member and then to the line section LFA for assembling the floor member with the upper vehicle body section.

Second Working Station S2 (FIG. 1)

The second working station S2 is disposed in the second conveyor passage line section T2 to remove the front door 21F, the rear door 21R, the engine hood 22, a front fender 26, a rear fender 27, the trunk lid 23, a rear panel 28 from the upper vehicle body section 24.

Figure 4:
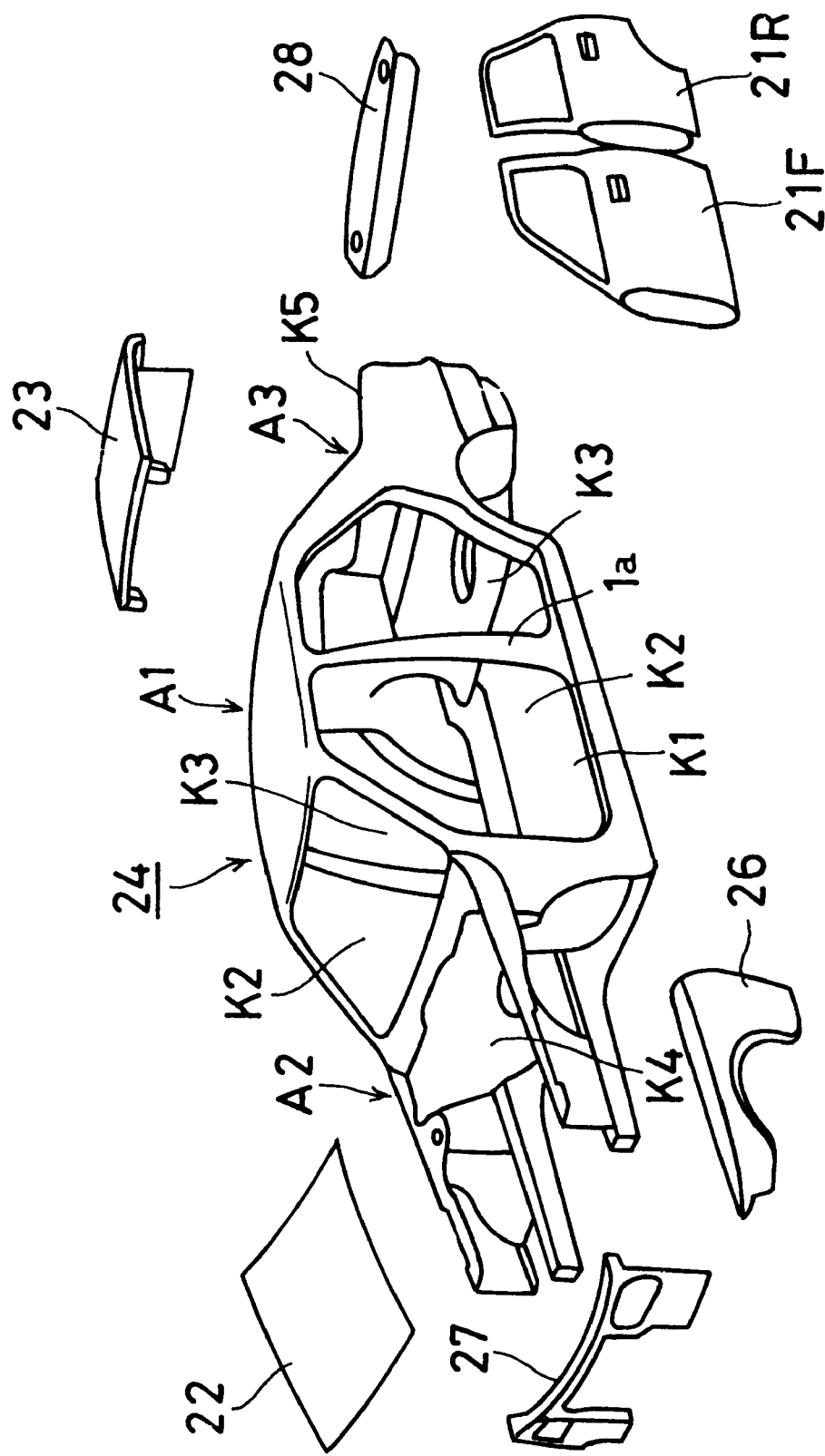

More specifically, as shown in FIG. 4, in the second working station S2, the front door 21F and the rear door 21R are removed from the cabin section A1 of the upper vehicle body section 24, and the engine hood 22, the front fender 26 and the rear fender 27 are removed from the engine room section A2 thereof, as well as the trunk lid 23 and the rear panel 28 are removed from the trunk room section A3 thereof. After the removal of the front door 21F and the rear door 21R from the cabin section A1 of the upper vehicle body section 24, the cabin section A1 comprises a floor opening section K1, front door opening sections K2 disposed on both sides of the vehicle body section 24 at the forward positions of respective central pillars 1a, and rear door opening sections K3 disposed on both sides of the vehicle body section 24 at the rearward positions of the respective central pillars 1a. The engine room section A2 is provided with an engine room opening section K4 by removing the engine hood 22, the front fender 26 and the rear fender 27 from the engine room section A2 of the upper vehicle body section 24. The trunk room section A3 is provided with a trunk room opening section K5 by removing the trunk lid 23 and the rear panel 28 from the trunk room section A3 of the upper vehicle body section 24.

Then, the upper vehicle body section 24 is conveyed through the second conveyor passage line section T2 for conveying the upper vehicle body section to the first working line section LP1 for mounting the parts to the upper vehicle body section 24. On the other hand, the various external members, such as the front door 21F, the rear door 21R, the engine hood 22, the front fender 26, the rear fender 27, the trunk lid 23, and the rear fender 27, removed from the upper vehicle body section 24 are conveyed through the fourth conveyor passages T4 for conveying external members to each of the first to six branch lines LE1 to LE6 for processing the corresponding external members.

First to Six Branch Lines LE1 to LE6 (FIG. 1)

The first branch line section LE1 is disposed to process a front shroud 27; the second branch line section LE2 to process the trunk lid 23; the third branch line section LE3 to process the rear panel 28 and to mount parts thereto; the fourth branch line section LE4 to process the engine hood 22; the fifth branch line section LE5 to process the front door 21F and the rear door 21R; and the sixth branch line section LE6 to process the front fender 26 and to mount parts thereto.

The external members, such as the front door 21F, the rear door 21R and so on, have been processed. To the resulting external members are mounted the parts in the respective branch lines LE1 to LE6, and the external members mounted with the parts are then conveyed through the respective six fourth conveyor passages T4 for conveying external members to the line section LEA for mounting the external parts to the assembly of the upper vehicle body section with the floor member.

First Working Line Section LP1 & Second Working Line Section LP2 (FIG. 1)

The first and second working line sections LP1 and LP2 are for mounting various parts to the upper vehicle body section while it is conveyed by the first conveyor or carriage 4 and by the second conveyor or carriage 5, respectively. As described hereinabove, as shown in FIG. 1, the first working line section LP1 is disposed in front of the second working line section LP2. The first working line section LP1 is of a loop structure, and the second working line section LP2 is of a loop structure. Further, the first and second working line sections LP1 and LP2 as a whole comprise a loop structure.

The first working line section LP1 for mounting the parts to the upper vehicle body is provided with a work transfer section P1a at the start end portion of the first work passage line sub-section R1a of the first work passage line section R1 and the upper vehicle body section 24 is loaded on the first mobile conveyor or carriage 5 in the work transfer section P1a where the upper vehicle body section 24 is transferred to the line section LP1 from the second conveyor passage line section T2.

The upper vehicle body section 24 transferred from the second conveyor line section T2 is conveyed by the first mobile conveyor or carriage 5 along the first work passage sub-section R1a of the first work passage line section R1 from its one end portion to the other end portion in the direction as indicated by the arrow X1. While the upper vehicle body section 24 is conveyed through the first work passage sub-section R1a of the first work passage line section R1, a variety of parts such as wire-harnesses, grommets, clips and so on are mounted to the upper vehicle body section 24 while the upper vehicle body section 24 is loaded on and conveyed by the first mobile conveyor or carriage 5.

The first work passage sub-section R1a of the first work passage line section R1 is provided at its other end portion with a work evacuation section Q1a where the upper vehicle body section 24 is transferred to the hanger conveyor Hi through which it is conveyed to the second working line section LP2 for mounting the parts, such as interior parts containing seat belts, a dash board unit, a rear seat, as well as front and rear window shield glass panels.

The second working line section LP2 for mounting the parts to the upper vehicle body section 24 is provided at the start end portion of the second work passage line sub-section R2a of the second work passage line section R2 with a work transfer section P2 where the upper vehicle body section 24 is transferred from the hanger conveyor line H1 to the second working line section LP2 and loaded on the second mobile conveyor or carriage 4 disposed so as to travel on and along the second working line section LP2.

The upper vehicle body section 24 loaded on the mobile conveyor or carriage 4 is then conveyed from its start end portion of the second work passage line subsection R2*a* of the second work passage line section R2 to its terminal end portion of the second work passage line sub-section R2*b* of the second work passage line section R2, as indicated by the arrow X2. During the conveyance of the upper vehicle body section 24 through the second work passage line sub-section R2*a* and the second work passage line sub-section R2*b*, the upper vehicle body section 24 is mounted with various parts such as interior units, dash board, rear seat, front window shield glass panel, rear window shield glass panel and so on.

The second work passage line section R2 is provided at its terminal end portion with a work evacuation section Q2 where the upper vehicle body section 24 is transferred to the hanger conveyor line H2 which in turn conveys the upper vehicle body section 24 to the first work passage line sub-section R1*b* of the first working line section LP1 for mounting the parts. At the start end portion of the first work passage line sub-section R1*b* in the first working line section LP1 for mounting the parts, a work transfer section P1*b* is disposed where the upper vehicle body section 24 is transferred from the hanger conveyor line H2 and loaded again on the first mobile conveyor or carriage 5.

The upper vehicle body section 24 reloaded on the first mobile conveyor or carriage 5 is then conveyed through the first work passage line sub-section R1*b* of the first work passage line section R1 from its start end portion to its terminal end portion by the first mobile conveyor or carriage 5. During this period of time of conveyance, the various parts mounted to the upper vehicle body section 24 are fastened with bolts to thereby finish the mounting operation. After the completion of the mounting operation, the upper vehicle body section 24 is then conveyed to a work evacuation section Q1*b* disposed at the terminal end portion of the first work passage line sub-section R1*b* of the first work passage line section R1 where the upper vehicle body section 24 is transferred from the first mobile conveyor or carriage 5 to the hanger conveyor line H3 which in turn conveys the upper vehicle body section 24 to the line section LFA for assembling the upper vehicle body section 24 with the floor member 25.

Line Section LFA (FIG. 1)

The line section LFA is arranged for assembling the upper vehicle body section 24 with the floor member 25. To the assembly of the upper vehicle body section 24 with the floor member 25 is mounted, in a station not shown in the drawing, an assembly of lower parts, such as driving system parts containing an internal combustion engine, exhaust system parts and suspension parts, assembled in a station, although not shown in the drawing.

The line section LFA for assembling the upper vehicle body section 24 with the floor member 25 is provided at its start end portion with an entry section WS for entering the upper vehicle body 24 from the hanger conveyor line H3. The line section LFA for mounting the floor member 25 to the upper vehicle body section 24 is further provided with a floor member entry section FS to which the floor member 25 is conveyed from the third conveyor passage line section T3 for conveying the floor member.

In the line section LFA, the resulting assembly of the upper vehicle body section 24 with the floor member 25 is then transferred to the line section LEA for mounting the external parts to the assembled vehicle body section.

Line Section LEA (FIG. 1)

The line section LEA for mounting the external parts to the assembled vehicle body section comprises first, second, third, fourth, fifth and sixth entry line sections ES1, ES2, ES3, ES4, ES5 and ES6, respectively, which are disposed in this sequence in a row along the direction in which the assembly of the upper vehicle body section 24 with the floor member 25 is conveyed. To each of the first, second, third, fourth, fifth and sixth entry line section ES1, ES2, ES3, ES4, ES5 and ES6, respectively, is connected a downstream end of fourth conveyor passages T4 for conveying the external members which have been removed in the second working station S2 and processed in the first to six branch line sections LE1 to LE6 for processing the external members, respectively.

The first entry line section ES1 is fed with the front shroud 27, the second entry line section ES2 is supplied with the trunk lid 23, and the third entry section ES3 is fed with the rear panel 28. On the other hand, the fourth entry section ES4 is supplied with the engine hood 22, the fifth entry section ES5 is fed with the front door 21F and the rear door 21R, and the sixth entry section ES6 is supplied with the front fender 26. These parts such as the front shroud 27, the trunk lid 23 and so on are mounted one after another to an upper vehicle body section, thereby finishing the assembly of the vehicle body 20.

After the removal of the upper vehicle body section 24 in the work evacuation section Q1*a* of the first working line section LP1 for mounting the parts to the upper vehicle body section, the first mobile conveyor or carriage 5 is then transferred through a connecting section from the work evacuation section Q1*a* disposed at the terminal end portion of the first work passage line sub-section R1*a* of the first work passage line section R1 to the work transfer section P1*b* disposed at the start end portion of the second work passage line sub-section R1*b* thereof.

After the upper vehicle body section 24 has been removed from the first mobile conveyor or carriage 5 and transferred to the third hanger conveyor line H3, the first mobile conveyor or carriage 5 is conveyed from the work transfer section P1*a* to the work transfer section P1*a* through a connecting section interposed between between the work evacuation section Q1*b* and the work transfer section P1*a*.

On the other hand, the second mobile conveyor or carriage 4 is transferred through a connecting section of the second work passage line section R2 from the work evacuation section Q2 disposed at the terminal end portion of the line sub-section R2*b* of the second work passage line section R2 to the work transfer section P2 disposed at the start end portion of the line sub-section R2*a* thereof after the upper vehicle body section 24 has been removed from the second mobile conveyor or carriage 4 in the work evacuation section Q2 thereof.

First Mobile Conveyors 5 (FIGS. 5–8)

Figure 5:
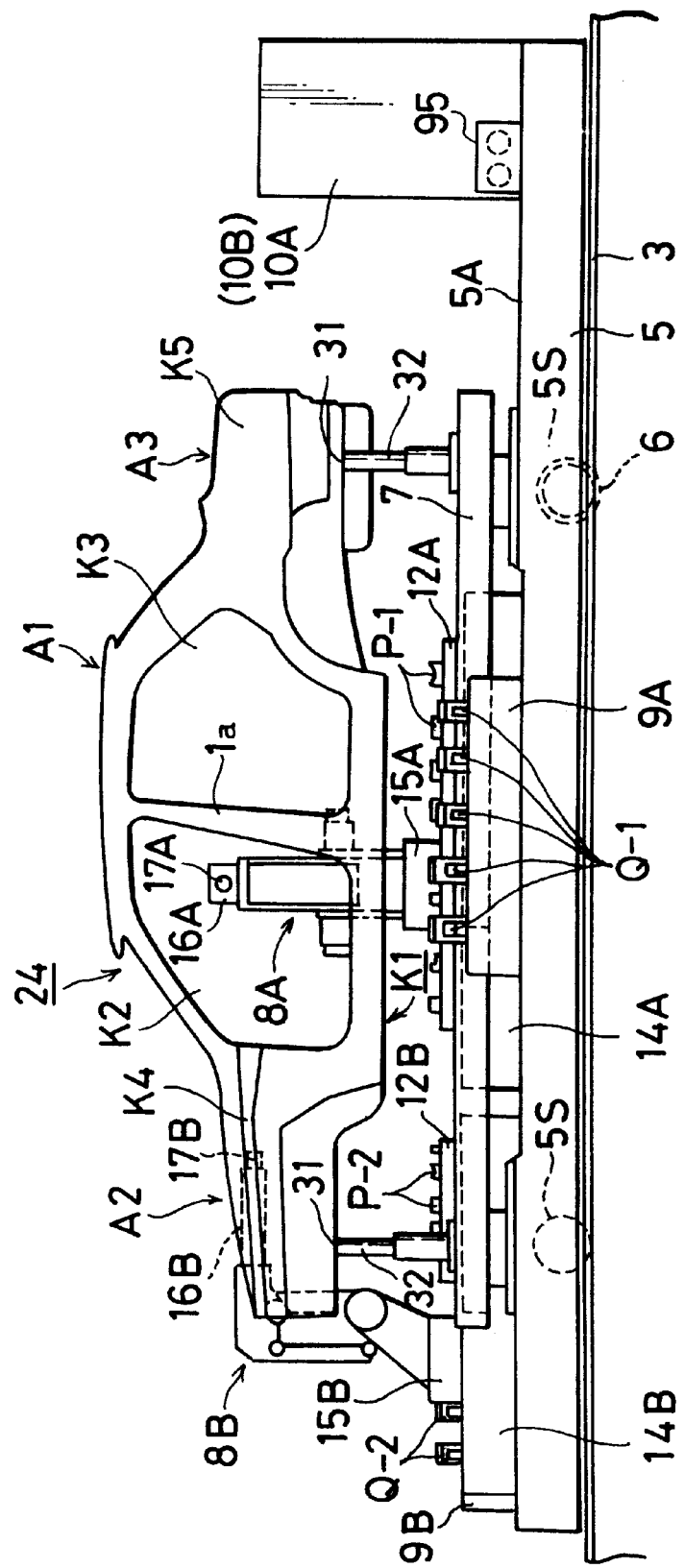
Figure 6:
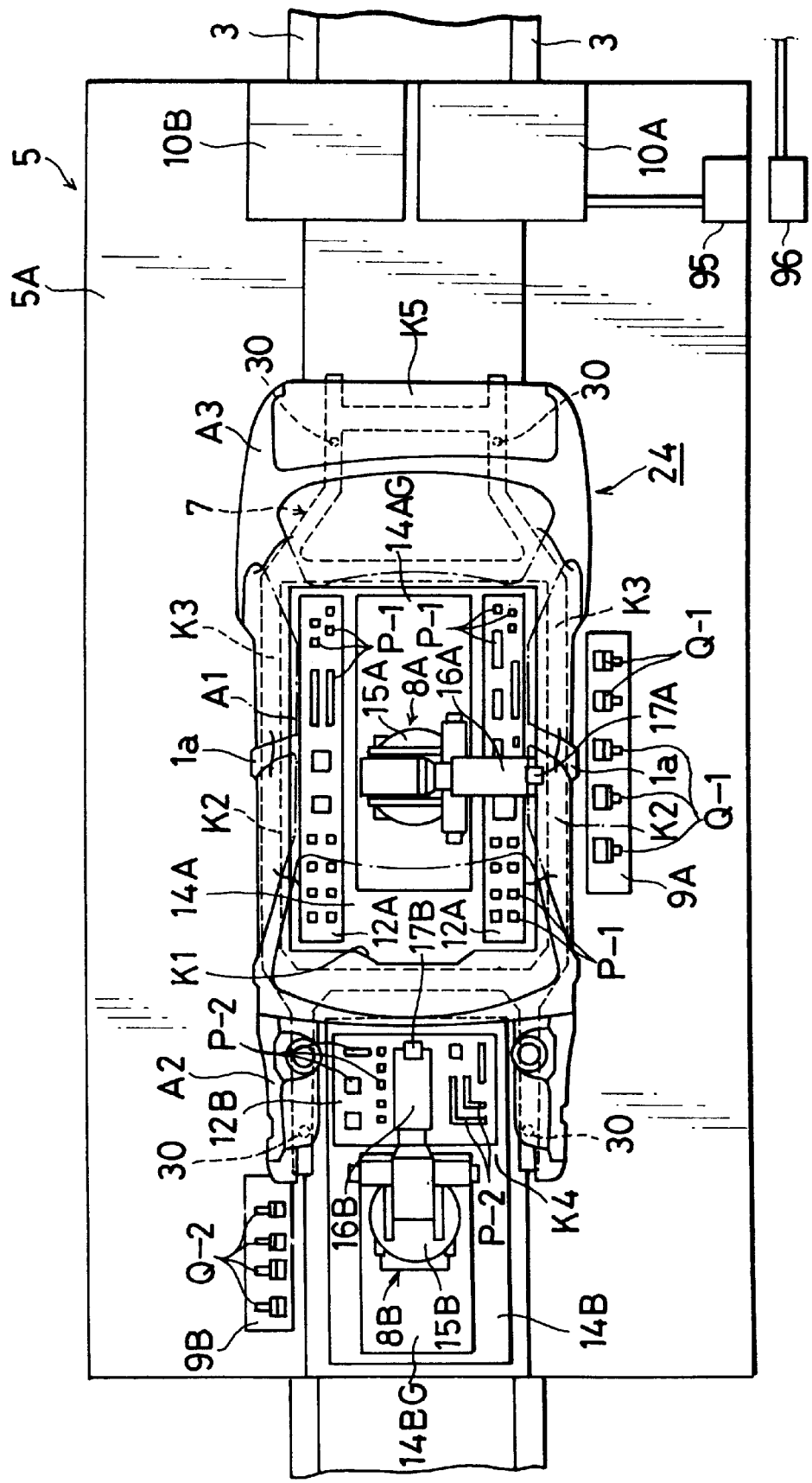
Figure 7:
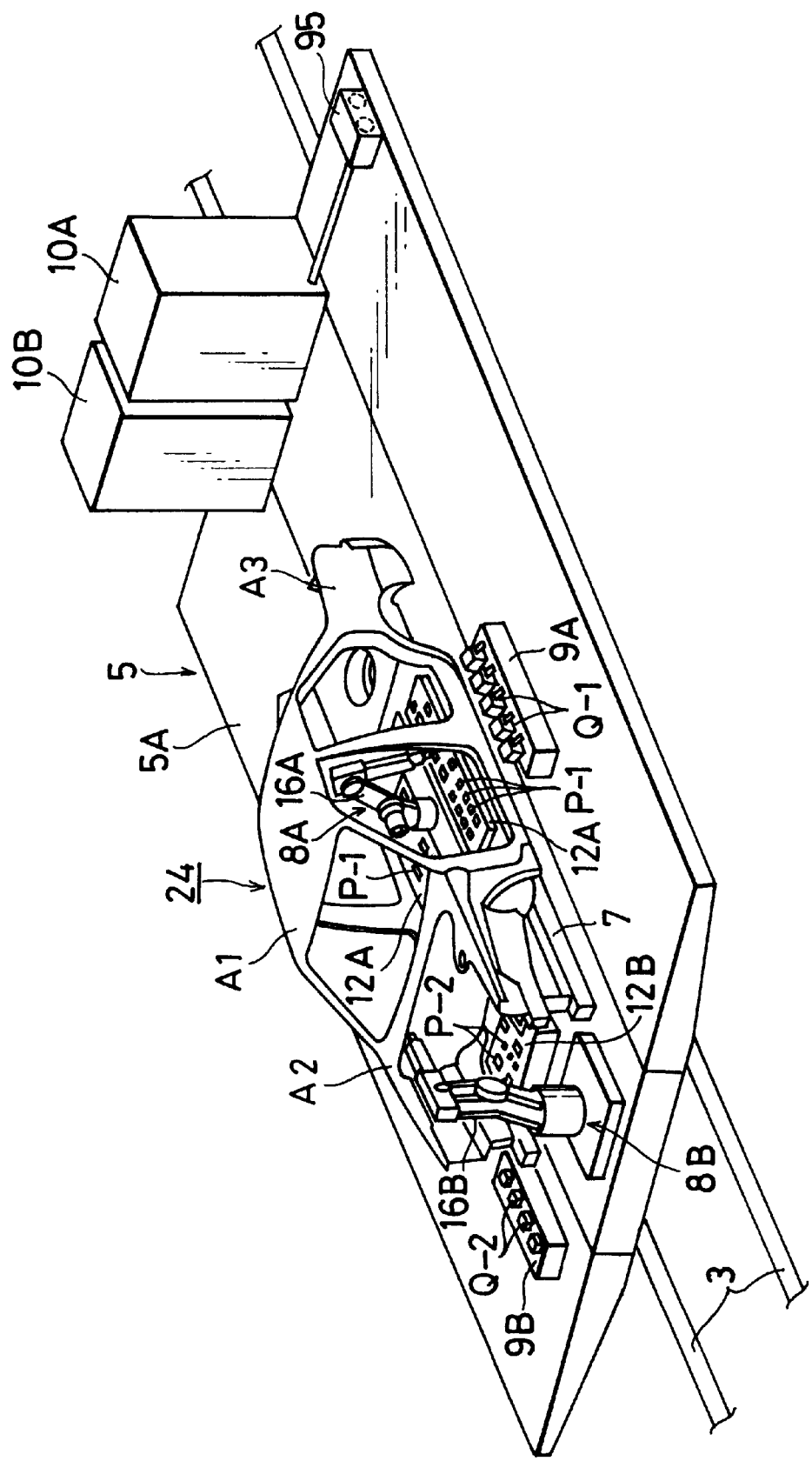
Figure 8:
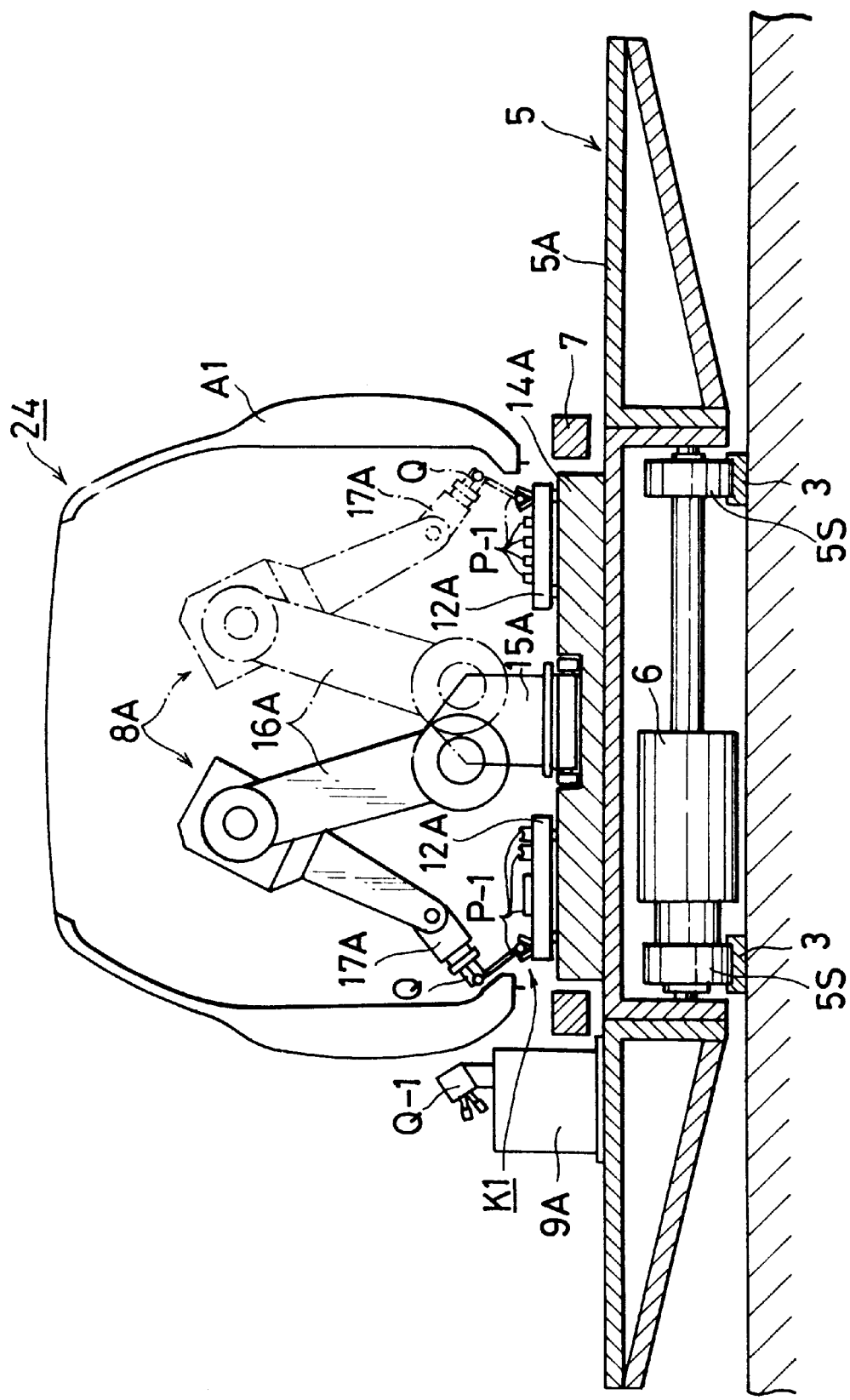

As shown specifically in FIGS. 5 and 8, the first mobile conveyors 5 are disposed in the first working line section LP1 for mounting the parts and the first mobile conveyor or carriage 5 is provided with pairs of wheels 5S including driving wheels 5S which are connected to each other through a shaft provided with an electric motor 6. The first mobile conveyor or carriage 5 is driven by the electric motor 6 on a rail 3 formed on the first work passage line section R1.

On a work support surface 5A of the first mobile conveyor or carriage 5 are disposed a main pallet 7, a first working robot 8A, a second working robot 8B, a tool table 9A, a tool table 9B, a control unit 10A, and a control unit 10B.

Main Pallet 7

The main pallet 7 is in a frame shape and a plurality of columns 32 are disposed erect on the main pallet 7. On a top face of each of the columns 32 is disposed erect an engagement pin 31 which is arranged to be engageable with each of plural holes 30 (FIG. 6) formed on bottom portions of the engine room section A2 and the trunk room section A3 of the upper vehicle body section 24. This structure aligns the upper vehicle body section 24 loaded on the first mobile conveyor or carriage 5 in such a state that the upper vehicle body section 24 is supported on the first mobile conveyor or carriage 5 by engaging the engagement pins 31 of the columns 32 with the engagement holes 30 of the upper vehicle body section 24.

First Working Robot 8A (FIGS. 5 to 8)

The first working robot 8A is disposed in a central portion of the first mobile conveyor or carriage 5. The first working robot 8A comprises a base table 14A disposed on the work support surface 5A of the first mobile conveyor or carriage 5, a pivotable section 15A disposed on the base table 14A, and a movable arm 16A supported by the pivotable section 15A. When the first mobile conveyor or carriage 5 is loaded with the upper vehicle body section 24, the first working robot 8A is positioned through the floor opening section K1 of the upper vehicle body section 24 in the inside of the cabin section A1.

The pivotable section 15A of the first working robot 8A is disposed so as to be movable in the longitudinal direction, i.e. in the lengthwise direction of the upper vehicle body section 24, up to a concave portion 14AG (FIG. 6) in the base table 14A. On the base table 14A is disposed a sub-pallet 12A in a predetermined position, and the various parts P-1 to be mounted to the vehicle cabin section, such as the grommets, wire-harnesses and so on are placed on the sub-pallet 12A in predetermined positions. The various parts P-1 for the vehicle cabin section to be placed on the sub-pallet 12A are mainly those to be mounted to the inside of the cabin section A1 of the upper vehicle body section 24.

Second Working Robot 8B (FIGS. 5 to 8)

The second working robot 8B is disposed in a forward portion of the first mobile conveyor or carriage 5 and comprises a base table 14B disposed on the work support surface 5A of the first mobile conveyor or carriage 5, a pivotable section 15B disposed on the base table 14B, and a movable arm 16B supported by the pivotable section 15B. When the first mobile conveyor or carriage 5 is loaded with the upper vehicle body section 24, the second working robot 8B is positioned through the engine room section K4 of the upper vehicle body section 24 in the inside of the engine room section A2.

The pivotable section 15B of the second working robot 8B is disposed so as to be movable in the longitudinal direction, i.e. in the lengthwise direction of the upper vehicle body section 24, up to a concave section 14BG (FIG. 6) in the base table 14B. On the base table 14B is disposed a sub-pallet 12B in a predetermined position, and various parts P-2 for the engine room, such as the grommets, wire-harnesses and so on, are placed on the sub-pallet 12B in predetermined positions. The various parts P-2 to be placed on the sub-pallet 12B are mainly those to be mounted to the inside of the engine room section A2 of the upper vehicle body section 24.

First & Second Tool Tables 9A & 9B

The first tool table 9A is disposed in the vicinity of the first working robot 8A. Specifically, the first tool table 9A is disposed in the position which a wrist section 17A of the first working robot BA can reach. On the tool table 9A are placed various tools Q-1 in predetermined positions, which are to be mounted detachably to the wrist section 17A of the first working robot 8A.

On the other hand, the second tool table 9B is disposed in the vicinity of the second working robot 8B. More specifically, the second tool table 9B is disposed in the position which a wrist section 17B of the second working robot 8B can reach. On the tool table 9B are placed various tools Q-2 in predetermined positions, which are to be detachably mounted to the wrist section 17B of the second working robot 8B.

First & Second Control Units 10A & 10B

The first control unit 10A and the second control unit 10B are disposed on the side portions of the first mobile conveyor or carriage 5.

The first control unit 10A is to control the first working robot 8A and generates a signal for controlling operations of the first working robot 8A in accordance with preset control program.

The second control unit 10B is to control the second working robot 8B and generates a signal for controlling operations of the second working robot 8B in accordance with preset control program.

Details of Operations in First Working Line Section LP1

As shown in FIG. 1, a parts supply station SP is positioned in front of the work transfer section P1a of the first working line section LP1 where the various parts P-1 and P-2 are loaded on the respective sub-pallets 12A and 12B disposed on the first mobile conveyor or carriage 5 in predetermined positions.

Hence, this arrangement does not require the part to be supplied to the first working robot 8A or the second working robot 8B, whenever the part is mounted to the upper vehicle body section 24 with the aid of the first working robot 8A or the second working robot 8B, because the small parts P-1 and P-2 are supplied at one location to the first mobile conveyor or carriage 5. This system can improve working and mounting efficiency in supplying the small parts P-1 and P-2 and in mounting them to the upper vehicle body section 24.

As described hereinabove, the upper vehicle body section 24 is first loaded on the first mobile conveyor or carriage 5 stationed in the work transfer section P1a located in the start end position of the first working line section LP1. More specifically, as shown in FIG. 5, the upper vehicle body section 24 is loaded on the first mobile conveyor or carriage 5 in such a way that the upper vehicle body section 24 is placed on the columns 32 disposed on the first mobile conveyor or carriage 5 and aligned with the aid of the engagement pins 31.

The upper vehicle body section 24 is loaded on the first mobile conveyor or carriage 5 in such a manner that the first working robot 8A is disposed so as to be located within the cabin section A1 and the second working robot 8B is disposed so as to be positioned within the engine room section A2.

After the upper vehicle body section 24 has been aligned with the first mobile conveyor or carriage 5, the electric motor 6 of the first mobile conveyor or carriage 5 is operated to allow the first mobile conveyor or carriage 5 to start travelling at a constant speed.

When the first mobile conveyor or carriage 5 is travelling on and along the first working line section LP1, the first control unit 10A generates a control signal to the first working robot 8A and the second control unit 10B generates a control signal to the second working robot 8B, thereby allowing the first working robot 8A to perform operations in a predetermined manner in association with the second working robot 8B.

The first working robot 8A reaches out its wrist section 17A through the front door opening section K2 or the rear door opening section K3 and allows one of the various tools Q-1 placed on the first tool table 9A to be picked up and to be mounted to the wrist section 17A of the first working robot 8A. Then, the first working robot 8A mounts the various parts P-1 for the vehicle cabin placed on the sub-pallet 12a one after another mainly to the inside of the cabin section A1 of the upper vehicle body section 24 by taking advantage of the tool Q mounted to the wrist section 17A of the first working robot 8A. As indicated by the solid line and the broken line in FIG. 8, the first working robot 8A selects a particular part P from the various parts P-1 for the vehicle cabin placed on the sub-pallet 12A with the aid of the tool Q mounted to the wrist section 17A of the first working robot 8A and the particular part P is mounted to the tool Q, thereby mounting the particular part P one after another to sites of the cabin section A1 of the upper vehicle body section 24 around the sub-pallet 12A. In mounting the various parts P-1 for the vehicle cabin to the upper vehicle body section 24, the tool Q to be mounted to the wrist section 17A of the first working robot 8A is changed by another tool Q appropriate for the various parts P-1 for the vehicle cabin to be next mounted to the cabin section A1 of the upper vehicle body section 24.

The second working robot 8B is operated in substantially the same manner as the first working robot 8A. In other words, the tool Q is selected from the tools Q-2 and mounted to a wrist section 17B of the second working robot 8B in accordance with the various parts P-2 placed on the sub-pallet 12B and the various parts P-2 mounted to the wrist section 17B of the second working robot 8B are mounted one after another mainly to the inside of the engine room section A2 of the upper vehicle body section 24 with the tool P-2 mounted to the wrist section 17B of the second working robot 8B.

As described hereinabove, the various parts P-1 for the vehicle cabin section and the various parts P-2 for the engine room section are mounted with the aid of the first and second working robots 8A and 8B disposed on the first mobile conveyor or carriage 5, respectively, to the upper vehicle body section 24 which has been aligned with the first mobile conveyor or carriage 5, while the first mobile conveyor or carriage 5 is being travelled on the first working line section LP1.

During the operations for mounting the parts by the first working robot 8A and the second working robot 8B, the upper vehicle body section 24 is kept in such a state that it is aligned with the first working robot 8A and the second working robot 8B with high accuracy, thereby reducing working load from the first working robot 8A and the second working robot 8B and losing a waiting time of the first working robot 8A and the second working robot 8B until the first mobile conveyor or carriage 5 is loaded with the upper vehicle body section 24. In addition, the exchanges for the tools can be made for each of the first working robot 8A and the second working robot 8B in an extremely short time, thereby improving operation rates of the first working robot 8A and the second working robot 8B to a remarkable extent.

Further, when the first mobile conveyor or carriage 5 or at least one of the first working robot 8A and the second working robot 8B causes a failure, the first mobile conveyor or carriage 5 is evacuated into the work evacuation line section Q1*a* or Q1*b* from the work passage line sections R1 of the first working line section LP1, thereby avoiding the situation in which the failure of the mobile conveyor or carriage 5, the first working robot 8A and/or the second working robot 8B exerts an adverse influence upon the first working line section LP1 for mounting the parts to the upper vehicle body section 24 in whole and suppressing a decrease in the production efficiency of the upper vehicle body sections 24. Further, the steps for the assembly operations of assembling the upper vehicle body sections 24 with the first mobile conveyor or carriage 5 can be changed with ease without causing inconvenience for the first working line section LP1 for mounting the parts, and the freedom of changes for the steps can be improved.

Figure 9:
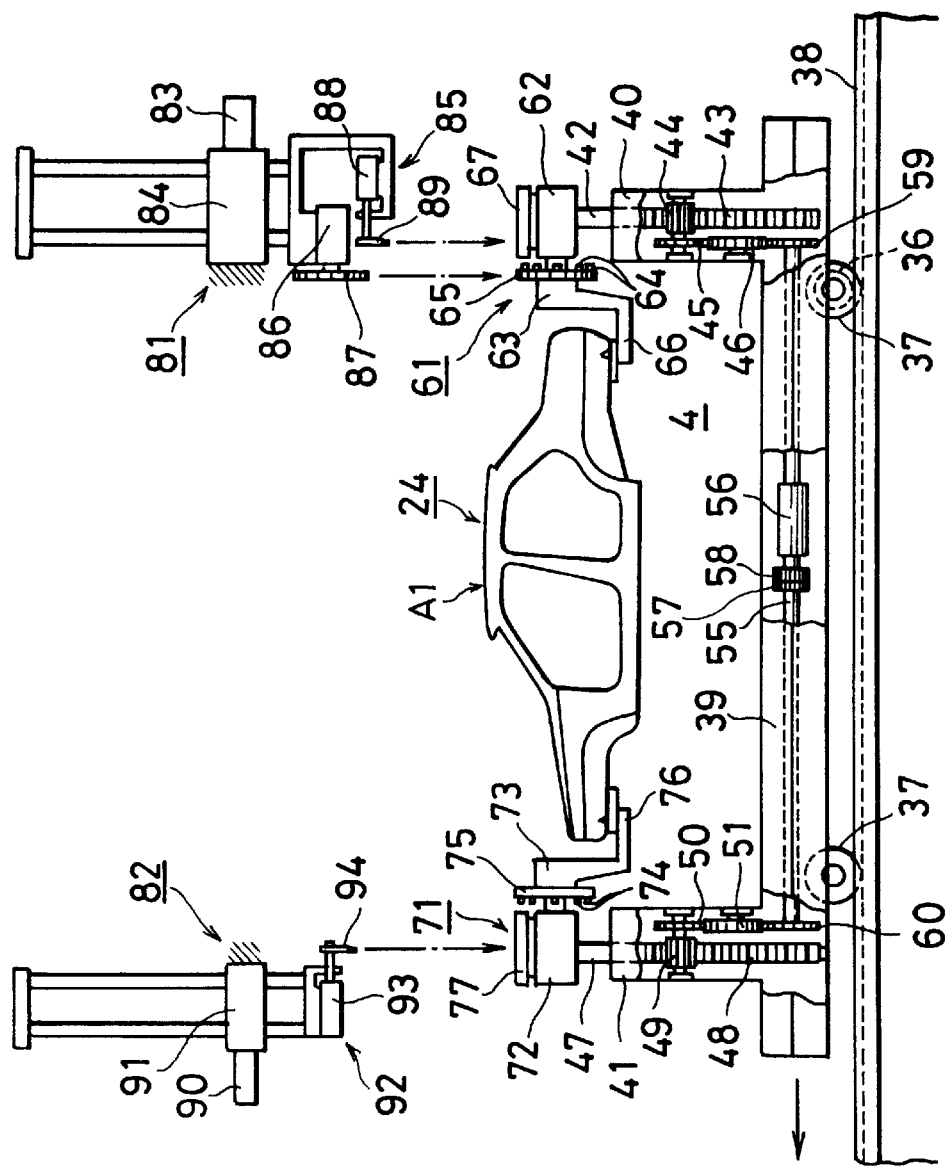
Figure 10:
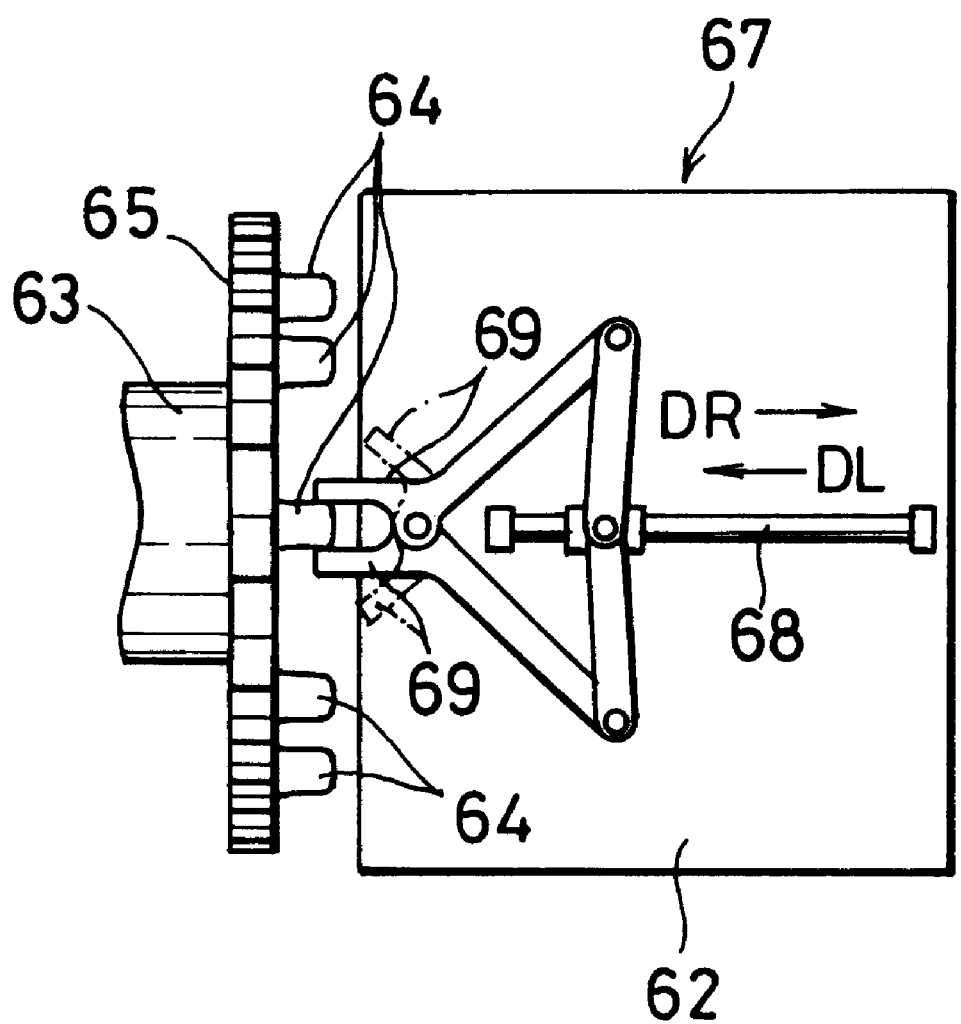
Figure 11:
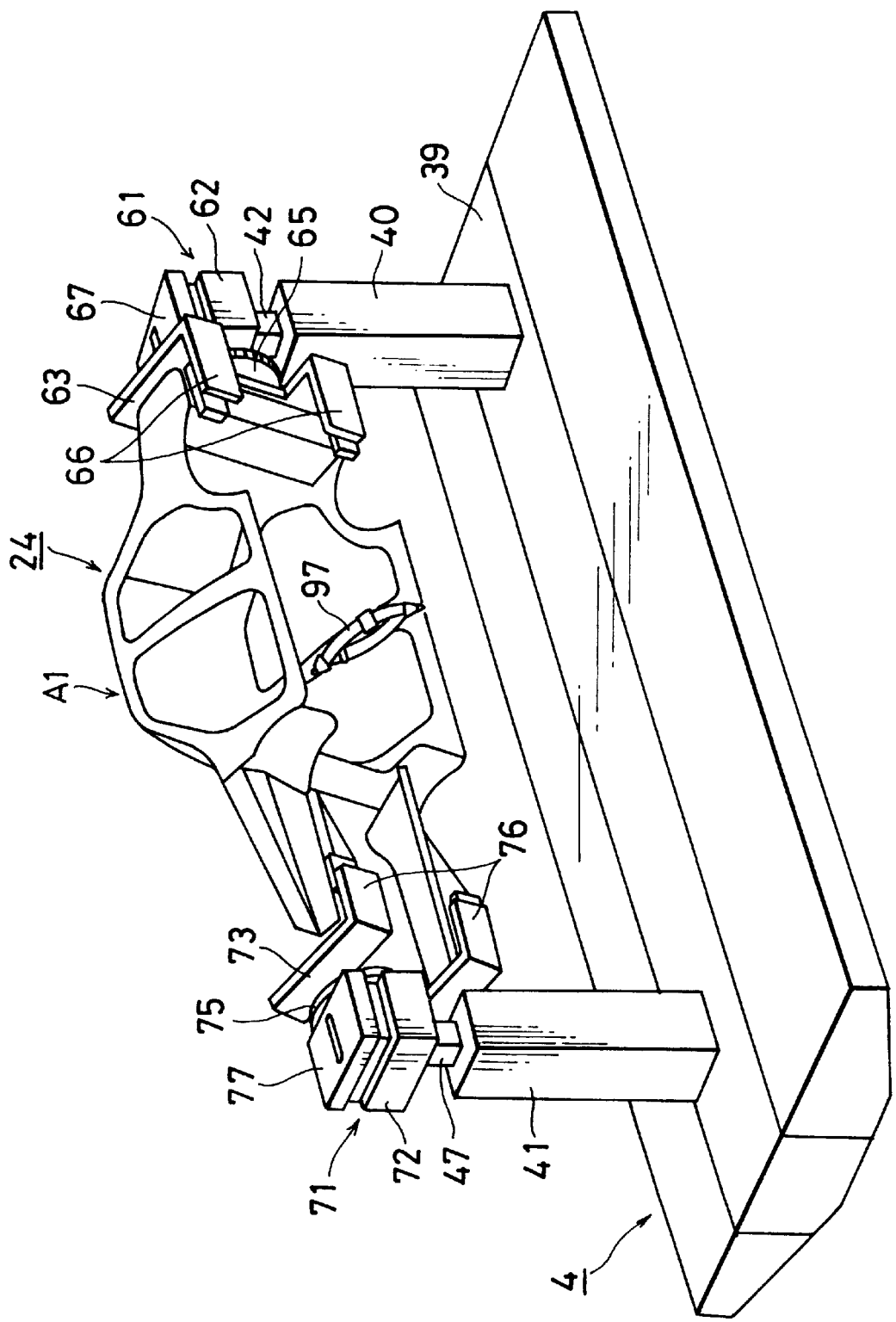

Second Mobile Conveyors or Carriages 4 (FIGS. 9 to 11)

The second mobile conveyors or carriages 4 are travelling on and along the second working line section LP2 for mounting the parts to the upper vehicle body section 24 after the other parts have been mounted thereto in the first working line section LP1 for mounting the parts to the upper vehicle body section 24.

As shown in FIG. 9, the second mobile conveyor or carriage 4 is provided with plural wheels 37 and the driving wheels of the plural wheels 37 are connected to an electric motor 36 mounted to a shaft connecting the driving wheels. The second mobile conveyor or carriage 4 is driven by the electric motor 36 and travels on a rail 38 constituting the second work passage line section R2.

As shown in FIGS. 9 and 11, the second mobile conveyor or carriage 4 has a base plate 39 extending in the longitudinal direction of the second mobile conveyor or carriage 4. A first support post 40 is disposed at its rearward end portion on the base plate 39 and a second support post 41 is disposed at its forward end portion on the base plate 39, each of the first and second support posts 40 and 41 extending upward.

A first shaft 42 is disposed on a top face of the first support post 40 and a second shaft 47 is disposed on a top face of the second support post 41. Each of the first and second shafts 42 and 47 is arranged to be lifted or lowered in association with each other.

Description will be made of an association mechanism for associating the first shaft 42 with the second supporting post 47.

A rack 43 is disposed on one side of the first shaft 42 and a pinion gear 44 is mounted to the first supporting post 40 so as to be meshable with the rack 43. Further, a first gear 45 coaxial with the pinion gear 43 and a second gear 46 in mesh with the first gear 45 are built in the first supporting post 40.

On the other hand, a rack 48 is mounted to one side of the second shaft 47 and a pinion gear 44 meshable with the rack 48 is mounted to the second supporting post 41. Further, a pinion gear 49 meshable with the rack 48, a first gear 50 coaxial with the pinion gear 49 and a second gear 51 meshable with the first gear 50 are built in the second supporting post 41.

In the base plate 39 are built a rotary shaft 55 extending in the lengthwise direction of the base plate 39 and an electric motor 56. At a central portion of the rotary shaft 55 is mounted a gear 57 which is arranged so as to be meshable with a driving gear 58 mounted to an output shaft of the electric motor 56. The rotary shaft 55 is provided at its rear end with a gear 59 and at its front end with a gear 60. The gear 59 is arranged to be in mesh with the second gear 46 of the first supporting post 40 and the gear 60 is arranged to be in mesh with the second gear 51 of the second supporting post 41.

With the arrangement as described hereinabove, the rotary force of the electric motor 56 is transmitted to the rotary shaft 55, followed by the transmission through the gear 59, the gear 46 and the gear 45 to the pinion gear 44 and, at the same time, by the transmission through the gear 60, the gear 51 and the gear 50 to the pinion gear 49. In other words, the pinion gears 44 and 49 are rotated at the same time in the same direction, thereby raising or lowering the first shaft 42 and the second shaft 47 in synchronization with each other.

To an upper end portion of the first shaft 42 is mounted a support mechanism section 61 for supporting the upper vehicle body section 24, which comprises a fixing section 62 for fixing the upper vehicle body section 24 and a support mechanism section 63 for supporting the upper vehicle body section 24, mounted rotatably to the fixing section 62. The support mechanism section 63 for supporting the upper vehicle body section 24 comprises a gear 65 and an engagement section 66 for the engagement with the upper vehicle body section 24. The gear 65 has a plurality of projections 67 on the side facing the fixing section 62, and the plural projections 67 are disposed in a ring-shaped form. The engagement section 66 is bolted to the vehicle body section 24. Further, a locking mechanism 67 for locking the gear 65 is mounted to a side portion of the fixing section 62, as shown in FIG. 10. The locking mechanism 67 is so disposed as to cause a pair of movable sections 69 to clamp a projection 64 to thereby lock the gear 65, when the locking mechanism 67 is displaced by an operating rod 68 in the direction as indicated by the arrow DR in FIG. 10. The projection 64 of the gear 65 is clamped with the pair of the movable sections 69, when the operating rod 68 is displaced in the direction as indicated by the arrow DL in FIG. 10, thereby locking the gear 65. On the other hand, when the operating rod 68 is moved in the direction as indicated by the arrow DL in FIG. 10, the clamping of the projection 64 with the pair of the movable section 69 is released, thereby unlocking the gear 65.

On a top end portion of the second shaft 47 is disposed a supporting mechanism section 71 for supporting the upper vehicle body section 24, which comprises a fixing section 72 for fixing the upper vehicle body section 24 and an arm member 73 for supporting the upper vehicle body section 24 mounted rotatably to the fixing section 72. To the arm member 73 for supporting the upper vehicle body section 24 is disposed a circular plate 75, and an engagement section 76 for engaging the upper vehicle body section 24 with the conveyor or carriage is connected to the arm member 73. To a side of the circular plate 75 facing the fixing section 72 are disposed a plurality of projections 74 which in turn are disposed in a ring-shaped form. The engagement section 76 is fixed to the upper vehicle body section 24. Further, the fixing section 72 is provided at its upper end portion with a locking mechanism 77 for locking the upper vehicle body section 24, which has substantially the same configuration as the locking mechanism 67 as shown in FIG. 10.

In plural positions in the second working line section LP2 for mounting the parts to the upper vehicle body section 24 are disposed pairs of engagement mechanisms 81 and 82 for engaging the respective support mechanism sections 61 and 71, as shown in FIG. 9. The engagement mechanisms 81 and 82 are disposed in a region over the second work passage line section R2 of the second working line section LP2.

The engagement mechanism 81 for the engagement with the support mechanism section 61 comprises an engagement section 85 for engaging with the support mechanism section 61 and a driving section 84 disposed in a fixed manner for elevating or lowering the engagement section 85. The engagement section 85 has a driving gear 87 to be rotatably driven by a second electric motor 86 so as to be meshed with the gear 65 of the support mechanism section 61 and a control section 89 for controlling the locking mechanism 67 to be drivable by an actuator 88.

The driving gear 87 of the engagement section 85 is meshed with the gear 65 of the support mechanism section 61 for supporting the upper vehicle body section 24 mounted on the first supporting post 40 of the second mobile conveyor or carriage 4. At the same time, the control section 89 is engaged with the locking mechanism 67 of the support mechanism section 61 for supporting the upper vehicle body section 24. The driving gear 87 is meshed with the gear 65 and driven by the second electric motor 86, thereby rotating the gear 65 in association with the rotation of the driving gear 87 and, at the same time, rotating the arm member 63 for supporting the upper vehicle body section 24 in association with the rotation of the gear 65. The control section 89 for controlling the locking mechanism 67 is engaged with the operating rod 68 of the locking mechanism 67. By the operation of the actuator 88, the operation rod 68 of the locking mechanism 67 is moved in the direction as indicated by the arrow DR in FIG. 10, thereby locking the gear 65, while the operating rod 68 is moved in the opposite direction as indicated by the arrow DL in FIG. 10, thereby unlocking the gear 65.

On the other hand, like the engagement mechanism 81, the engagement mechanism 82 for engaging the support mechanism section 61 comprises a driving section 91 and an engagement section 92 to be lifted or lowered by the driving section 91. The driving section 91 is provided with an electric motor 90. The engagement section 92 has a control section 94 for controlling a locking mechanism 77 to be drivable by an actuator 93. When the engagement section 92 is lowered by the driving section 91, the control section 94 is engaged with the locking mechanism 77 of the support mechanism section 71 for supporting the upper vehicle body section 24 mounted on the supporting post 41 of the second mobile conveyor or carriage 4.

The control section 94 for controlling the locking mechanism 77 is driven by the actuator 93 in such a state that the control section 94 is engaged with the locking mechanism 77, thereby locking the locking mechanism 77 for locking the circular plate 75 mounted to the fixing section 72 or unlocking the locking mechanism 77 therefor.

In the second working line section LP2 for mounting the parts to the upper vehicle body section 24 loaded on the second mobile conveyor or carriage 4, various parts are mounted to the upper vehicle body section 24 conveyed from and transferred from the first working line section LP1 for mounting the parts to the upper vehicle body section 24.

The upper vehicle body section 24 is loaded on the second mobile conveyor or carriage 4 from above in the work transfer section P2. As shown in FIG. 9, both of the lengthwise end portions of the upper vehicle body section 24 are fixed to the engagement sections 66 and 67 for the engagement with the upper vehicle body section 24.

The plural second mobile conveyors 4 are intermittently driven on and along the second working line section LP2 for mounting the parts to the upper vehicle body section 24. In the course during which the second mobile conveyor or carriage 4 reaches the work evacuation section Q2, the interior units containing seat belts, the dash board unit, the rear seat, the front and rear window shield glass panels and so on are mounted to the upper vehicle body section 24.

In mounting the interior units, each of the dash board units, and so on, to the upper vehicle body section 24, the arm member 63 of the support mechanism section 61 and the arm member 73 of the support mechanism section 71 pivot at a predetermined angle in accordance with the parts to be mounted to the upper vehicle body section 24.

In addition, the gear 65 mounted to the arm member 63 for supporting the vehicle body section is brought into a locked state by operating the locking mechanism 67, and the circular plate 75 mounted to the arm member 73 for supporting the vehicle body section is brought into a locked state by operating the locking mechanism 77.

Further, the first shaft 42 is lifted or lowered in synchronization with the lifting or lowering of the second shaft 47 by operating the electric motor 56 built in the base plate 39, thereby allowing the upper vehicle body section 24 to assume the position in which the parts can be easily mounted to the upper vehicle body section 24.

Specific description will now be made of the mounting of the parts by taking the mounting of the seat belt as an example.

Before the seat belt is mounted, the second mobile conveyor or carriage 4 is suspended in the position underneath a pair of the engagement mechanism 81 and the engagement mechanism 82, as shown in FIG. 9. At the same time, each of the engagement mechanism 81 and the engagement mechanism 82 are set to be in the lowering position by operating the electric motor 83 of the engagement mechanism 81 and the electric motor 90 of the engagement mechanism 82, respectively.

This arrangement allows the engagement section 85 of the engagement mechanism 81 to be meshed with the gear 65 of the arm member 63 for supporting the vehicle body section with the aid of the driving gear 87 disposed thereto, thereby allowing the control section 89 to be engaged with the locking mechanism 67 of the support mechanism section 61 for supporting the vehicle body section. Further, the engagement section 92 of the support mechanism 82 for supporting the upper vehicle body section 24 is engaged with the locking mechanism 77 of the support mechanism section 71 for supporting the upper vehicle body section 24 with the aid of the control section 94 for controlling the locking mechanism 77.

Then, the electric motor 86 mounted to the engagement section 85 of the engagement mechanism 81 is operated to rotate the driving gear 87, thereby driving the gear 65 of the arm member 63 for supporting the vehicle body section and pivoting the arm member 63 for supporting the vehicle body section. In this instance, the pivotal movement of the arm member 63 is transmitted to the arm member 73 for supporting the vehicle body section through the upper vehicle body section 24 and the arm member 73 pivots in association with the pivotal movement of the arm member 63.

By the pivotal movement of the arm member 63 for supporting the vehicle body section and the arm member 73 for supporting the vehicle body section, the operation of the electric motor 86 is suspended in the position in which the upper vehicle body section 24 is rotated at an angle appropriate for mounting the seat belt 97. Then, the actuator 88 mounted to the engagement section 85 of the engagement mechanism 81 and the actuator 93 mounted to the engagement section 92 of the engagement mechanism 82 are operated, thereby locking the control section 89 mounted to the engagement section 85 of the engagement mechanism 81 with the locking mechanism 67 of the support mechanism section 61 for supporting the vehicle body section and, as a result, regulating the rotation of the gear 65.

Likewise, the control section 94 mounted to the engagement section 92 of the engagement mechanism 82 locks the support mechanism section 71 for supporting the vehicle body section, thereby regulating the rotation of the circular plate 75 of the arm member 73 for supporting the vehicle body section.

With the arrangement as described hereinabove, the upper vehicle body section 24 assumes the posture appropriate for mounting the seat belt.

The electric motor 56 built in the base plate 39 of the second mobile conveyor or carriage 4 is then operated to rotate the rotary shaft 55 to lift or lower the first shaft 42 in synchronization with the second shaft 47, thereby setting the upper vehicle body section 24 to assume a position appropriate for mounting the seat beat 97. As a result, as shown in FIG. 11, the upper vehicle body section 24 supported by the second mobile conveyor or carriage 4 assumes the posture appropriate for mounting the seat belt and the vertical position in which the seat belt is to be mounted with ease.

Thereafter, the second mobile conveyor or carriage 4 starts travelling and the seat belt 97 is mounted to the upper vehicle body section 24 while the second mobile conveyor or carriage 4 is travelling.

As described hereinabove, the various parts are mounted to the upper vehicle body section 24 while the upper vehicle body section 24 takes the posture appropriate for mounting them and the vertical position likely to mount them in the second working line section LP2 for mounting the parts, thereby performing the operations for mounting the various parts to the upper vehicle body section 24 with efficiency.

Figure 12:
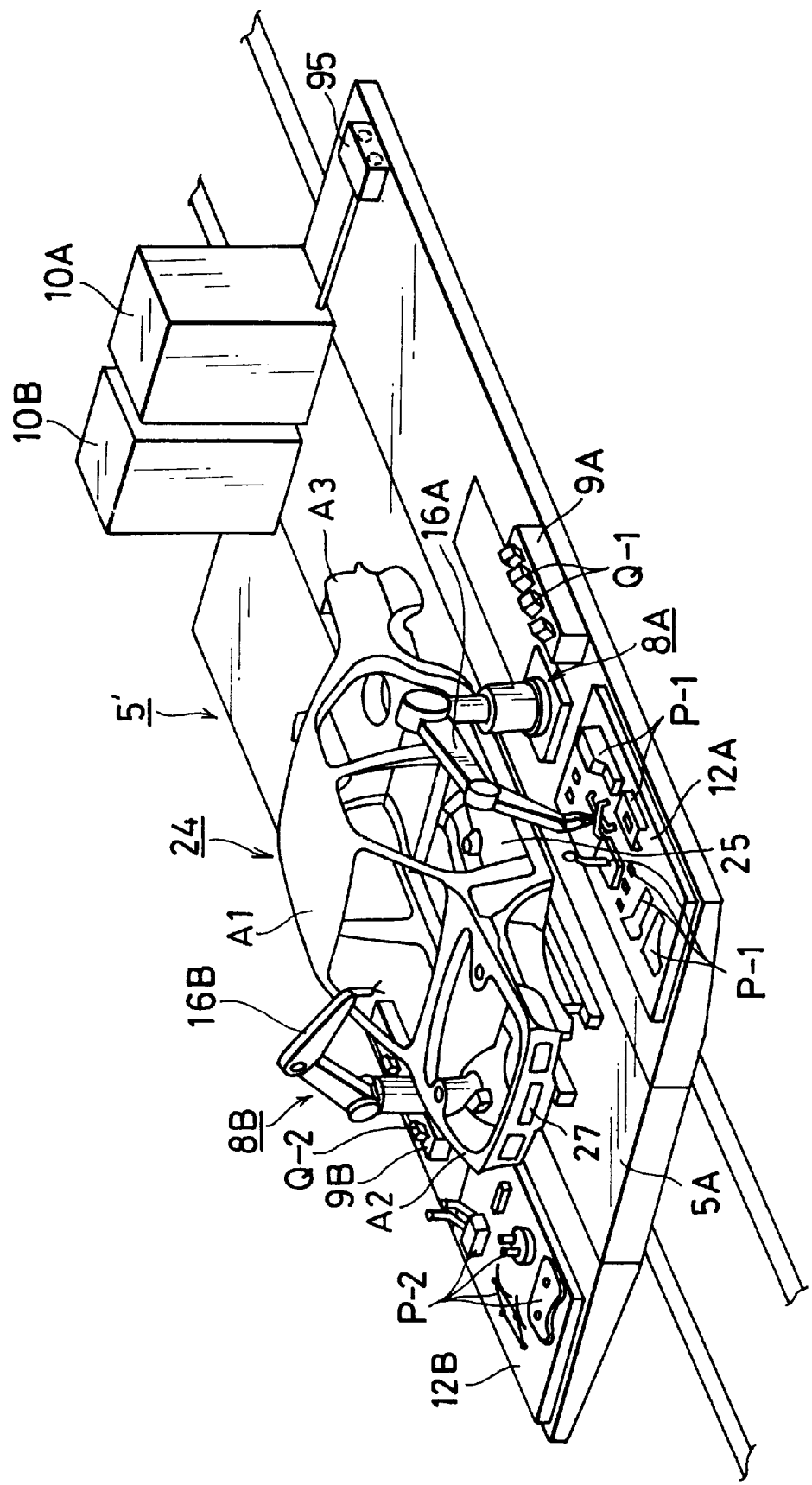
FIG. 12 is a perspective view showing a variant of the first conveyor or carriage.

The embodiments as shown in FIGS. 12 et seq are directed to other embodiments and their variants, in which the identical elements are provided with the identical reference symbols and numerals, and a description of these identical elements will be omitted from the following description for brevity of explanation. The description which follows relates to the characteristic portions of the embodiments and the variants.

Variants of First Mobile Conveyors or Carriages 5
(FIG. 12)

The first mobile conveyor or carriage 5 is applicable to the case wherein the floor member 25 is mounted to the upper vehicle body section 24.

The upper vehicle body section 24 has the cabin section A1, the engine room section A2 and the trunk room section A3, although the cabin section A1 is provided with no floor opening section because the floor member 25 is mounted to the upper vehicle body section 24. Further, the front shroud 27 is mounted to the engine room section A2.

The first working robot 8A and the second working robot 8B are disposed on both side portions of the first mobile conveyor or carriage 5 so as to interpose the upper vehicle body section 24.

The various parts P-1 such as shift levers and so on are disposed in predetermined positions on the sub-pallet 12A for the first working robot 8A, and the various parts P-2 such as wipers and so on are disposed in predetermined positions on the sub-pallet 12B for the second working robot 8B.

Example of Control System for First Conveyors or Carriages 5 & 5'

Figure 13:
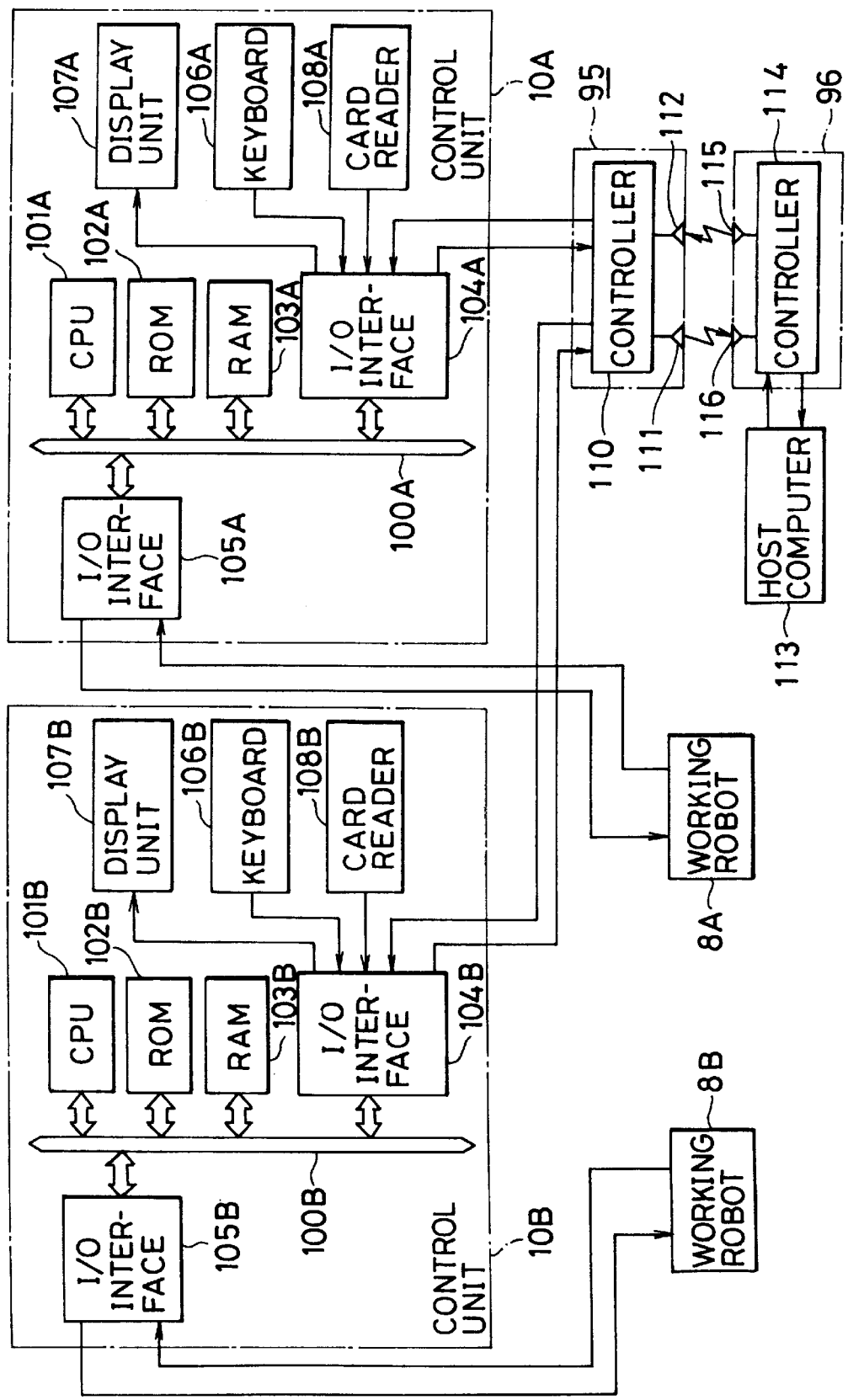
FIG. 13 is a block diagram showing the detail of a control system for controlling the first working robot disposed on the first conveyor or carriage and the second working robot.

As shown in FIG. 13, the first control unit 10A and the second control unit 10B loaded on the first mobile conveyor or carriage 5 or 5' are connected to a unit 95 for transmitting or receiving signals which in turn is loaded on the first mobile conveyor or carriage 5 or the first mobile conveyor or carriage 5'. The unit 95 is disposed parallel to a unit 96 for transmitting or receiving signals connected to a host computer 113 constituting a section for supplying working data, for example, when the first mobile conveyor or carriage 5 is located in the work transfer section P1a of the first working line LP1. With the arrangement for the control system as described hereinabove, a signal generated from the first control unit 10A or second control unit 10B is received by the unit 95 for transmitting or receiving signals, and the unit 95 then generates a signal to the unit 96 which in turn transmits the signal to the host computer 113. The working data generated from the host computer 113 is received by the unit 96 and then supplied to the unit 95 and eventually to the first control unit 10A or second control unit 10B.

The first control unit 10A comprises a central processing unit (CPU) 101A, a read-only memory (ROM) 102A for storing operating programs and so on for the CPU 101A, a random access memory (RAM) 103A for writing and reading a variety of data as well as input-output interfaces (I/O interfaces) 104A and 105A, each being connected to each other through a bus line 100A. To the I/O interface 104A are connected a keyboard 106A, a display unit 107A composed of, for example, a cathode ray tube (a CRT), and a card reader 108A for reading data and information recorded on a card-type recording medium such as magnetic cards. The I/O interface 104A is then connected to the unit 95 for transmitting or receiving signals, and the I/O interface 105A is connected to the first working robot 8A.

The unit 95 for transmitting or receiving signals has a control section 110 for controlling the transmission and receipt of signals connected to the I/O interface 104A, a transmitting head section 111 connected to the control section 110, and a receiving head section 112 connected thereto. Likewise, the unit 96 for transmitting or receiving signals has a control section 114 for controlling the transmission or receipt of signals, connected to the host computer 113, a transmitting head section 115 connected to the control section 114, and a receiving head section 116 connected thereto.

On the other hand, the second control unit 10B comprises a central processing unit (CPU) 101B, a read-only memory (ROM) 102B for storing operating programs and so on for the CPU 101B, a random access memory (RAM) 103B for writing and reading a variety of data as well as input-output interfaces (I/O interfaces) 104B and 105B, each being connected to each other through a bus line 100B. To the I/O interface 104B are connected a keyboard 106B, a display unit 107B composed of, for example, a cathode ray tube (a CRT), and a card reader 108B for reading data and information recorded on a card-type recording medium such as magnetic cards. The I/O interface 104B is then connected to the unit 95 for transmitting or receiving signals, and the I/O interface 105B is connected to the second working robot 8B.

As the upper vehicle body section 24 is loaded on the first mobile conveyor or carriage 5 in the work transfer section P1a of the first working line sub-section R1, the keyboard 106A of the first control unit 10A is operated to enter information and data concerning the upper vehicle body section 24 as well as to enter an instruction to require the working data for the first working robot 8A. Then, the first control unit 10A allows the CPU 101A operable on the basis of the operating program stored in the ROM 102A to send a request signal for requesting the working data for the first working robot 8A. The request signal is transmitted to the control section 110 of the unit 95 for transmitting or receiving signals through the I/O interface 104A. The request signal supplied to the control section 110 from the first control unit 10A is then transmitted from the transmitting head section 111 to the unit 96 for transmitting or receiving signals.

In the unit 96 for transmitting or receiving signals, the request signal from the transmitting head section 111 of the unit 95 for transmitting or receiving signals is received by the receiving head section 116 and then supplied through the control section 114 for controlling the transmission or receipt of signals to the host computer 113. The host computer 113 then generates the working data for the first working robot 8A relating to the upper vehicle body section 24 on the basis of the request signal from the first control unit 10A. The working data generated from the host computer 113 is supplied to the control section 114 of the unit 96 for transmitting or receiving signals, and the working data supplied to the control section 114 is transmitted from the transmitting head section 115 to the unit 95 for transmitting or receiving signals.

On the other hand, in the control unit 95 for transmitting or receiving signals, the working data fed from the transmitting head section 115 of the unit 96 for transmitting or receiving signals is received by the receiving head section 112 and then supplied to the I/O interface 104A of the first control unit 10A through the control section 110 for controlling the transmission and receipt of signals. The working data supplied to the I/O interface 104A is then processed by the CPU 101A and written on and stored in the RAM 103A. In this case, a status of processing by the CPU 101A is displayed on the display unit 107A of the first control unit 10A. The working data may be stored into RAM 103A by the card reader 108A.

Thereafter, the keyboard 106B of the second control unit 10B is operated to enter information and data relating to the upper vehicle body section 24 as well as to enter an instruction to require the working data for the second working robot 8B. Then, the second control unit 10B allows the CPU 101B to send a request signal to request the working data for the second working robot 8B. The request signal is transmitted to the control section 110 of the unit 95 for transmitting or receiving signals through the I/O interface 104B. The request signal supplied to the control section 110 from the second control unit 10B is then transmitted from the transmitting head section 111 to the unit 96 for transmitting or receiving signals.

In the unit 96 for transmitting or receiving signals, the request signal from the transmitting head section 111 of the unit 95 for transmitting or receiving signals is received by the receiving head section 116 and then supplied through the receiving head section 116 to the host computer 113. The host computer 113 then generates the working data for the second working robot 8B relating to the upper vehicle body section 24 on the basis of the request signal from the second control unit 10B. The working data generated from the host computer 113 is supplied to the control section 114 of the unit 96 for transmitting or receiving signals, and the working data supplied to the control section 114 is transmitted from the transmitting head section 115 to the unit 95 for transmitting or receiving signals.

On the other hand, in the control unit 95 for transmitting or receiving signals, the working data fed from the transmitting head section 115 of the unit 96 for transmitting or receiving signals is received by the receiving head section 112 and then supplied to the I/O interface 104B of the second control unit 10B through the control section 110 for controlling the transmission and receipt of signals. The working data supplied to the I/O interface 104B is then processed by the CPU 101B and written on and stored in RAM 103B. In this case, a status of processing by the CPU 101B is displayed on the display unit 107B of the second control unit 10B. The working data may be stored into the RAM 103B by the card reader 108B.

After the working data relating to the first working robot 8A and the second working robot 8B has been stored in the RAMs 103A and 103B, respectively, in the manner as described hereinabove, the electric motor 6 is operated to run the first mobile conveyor or carriage 5 on the rail 3 at a predetermined speed.

As the first mobile conveyor or carriage 5 starts running, the first control unit 10A generates a signal for controlling the operations of the first working robot 8A through the I/O interface 105A to the first working robot 8A on the basis of the working data stored in the RAM 103A. At the same time, various output signals detected by the first working robot 8A are fed through the I/O interface 105A to the first control unit 10A.

The first working robot 8A moves on the base table 14A of the first mobile conveyor or carriage 5, as needed, as well as selects the necessary tool Q from the various tools Q-1 disposed on the sub-pallet 12A and mounts the selected tool Q to its own wrist section 17A with the particular parts P mounted thereto, thereby performing the mounting operations of the various parts P-1.

In the same manner as with the first working robot 8A, a signal for controlling the operations of the second working robot 8B is fed to the second working robot 8B through the I/O interface 105B from the second control unit 10B in accordance with the working data stored in the I/O interface 105B. On the other hand, various output signals detected by and generated from the second working robot 8B are supplied through the I/O interface 105B to the second control unit 10B.

Like the first working robot 8A, the second working robot 8B moves on the base table 14B of the first mobile conveyor or carriage 5, as needed, as well as selects the necessary tool Q from the various tools Q-2 disposed on the sub-pallet 12B and mounts the selected tool Q to its own wrist section 17B with the particular parts P mounted thereto, thereby performing the mounting operations of the various parts P-2.

Another Example of Vehicle Body Assembly Line (FIGS. 14 to 17)

In this embodiment, the second working line section LP2 for mounting the parts to the upper vehicle body section 24 is arranged in such a manner that terminal ends of a conveyor passage Ti for conveying interior units, a conveyor passage Tx for conveying various parts and a conveyor passage Td for conveying instrument panels are connected to the second work passage line sub-section R2a of the second work passage line section R2.

In the second working line section LP2 for mounting the parts to the upper vehicle body section 24, the second mobile conveyor or carriage 4 receives interior units including an interior member, such as an integral part composed of a top sealing member and a pillar trim member, to be supplied from the conveyor passage Ti for conveying the interior units, and the interior unit is mounted to the upper vehicle body section 24 loaded on the second mobile conveyor or carriage 4. Further, the second mobile conveyor or carriage 4 receives various parts, such as a roof molding, a seat belt, a rear seat, a front window shielding glass panel, a rear window shielding glass panel and so on, to be supplied from the conveyor passage Tx for conveying the various parts and these parts are mounted to the upper vehicle body section 24 in the same manner as the interior units fed from the conveyor passage Ti for conveying interior units. In addition, the instrument panel unit 195 and so on are likewise supplied to the second mobile conveyor or carriage 4 from the conveyor passage Td for conveying instrument panels 195 and then mounted to the upper vehicle body section 24 loaded on the second mobile conveyor or carriage 4 in the course where the second mobile conveyor or carriage 4 travels in the second working line section LP2 for mounting the parts to the upper vehicle body section 24.

Figure 15:
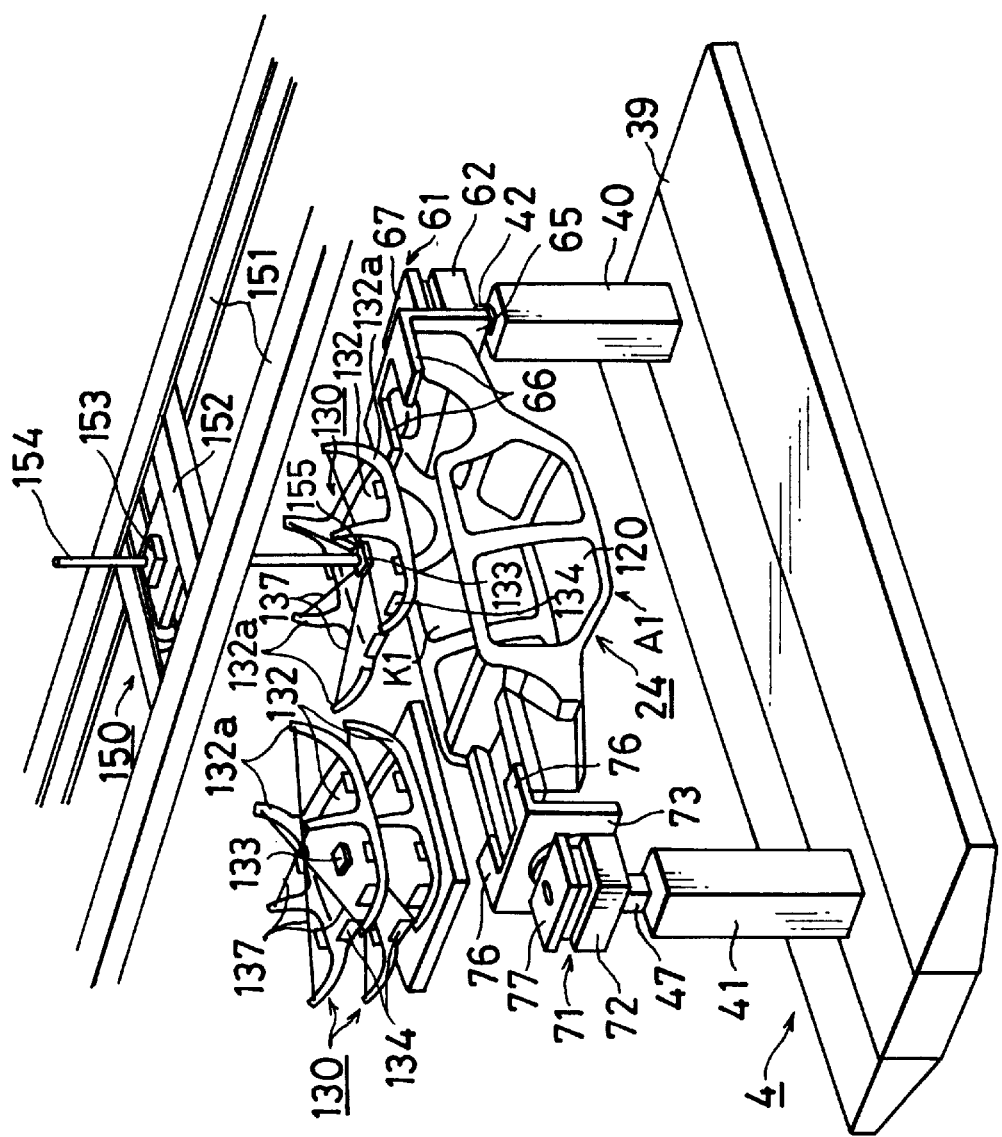
FIG. 15 is a perspective view showing a working station for mounting cabin interior units to the upper vehicle body section loaded on the second conveyor or carriage in the position in which the upper vehicle body section is turned upside down.

The second mobile conveyor or carriage 4 reverses the upper vehicle body section 24 at the predetermined angle, as shown in FIG. 15, in the stage prior to the timing when the interior units are to be received from the conveyor passage Ti for conveying the interior units. In other words, as shown in FIG. 15, the upper vehicle body section 24 loaded on the second mobile conveyor or carriage 4 is reversed with its roof section 120 and its floor opening section K1 turned upside down.

Figure 16:
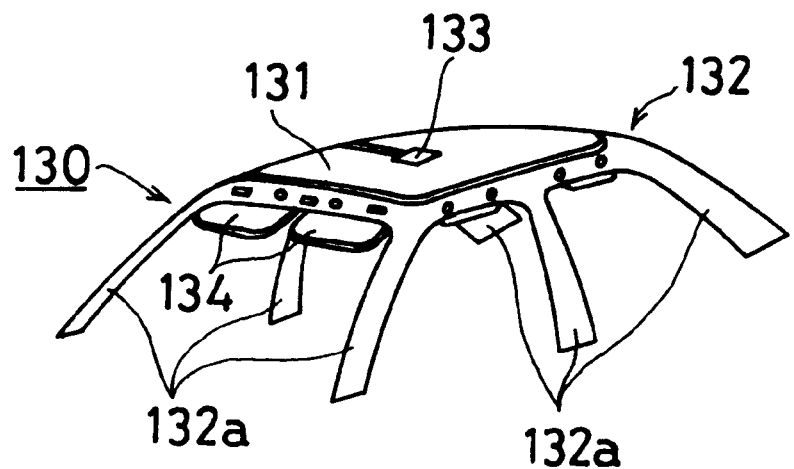
FIG. 16 is a perspective view showing an example of the cabin interior unit.

The interior units conveyed through the conveyor passage Ti for conveying the interior units may include, for example, an integral part, as indicated by 130 in FIG. 16, composed of the top sealing member 131 and the pillar trim member 132 and made of synthetic plastic materials having elasticity in whole. The top sealing member 131 is provided at its central portion with a room lamp section 133, and the pillar trim member 132 has a plurality of slender pillar sections 132a and is provided with a sun visor 134. The interior unit 30 is then turned upside down, as shown in FIG. 15. In other words, the interior unit 130 is supplied from the conveyor passage Ti for conveying interior units to the second working line section LP2 in such a state that the top sealing member 131 and the pillar sections 132a are turned upside down. Further, an end portion of one pillar section 132a is connected with a wire 137 to an end portion of the pillar section 132a located in the diagonal position. Likewise, the end portion of another pillar section 132a is connected with a wire 137 to the end portion of the opposite pillar section 132a in the same manner as described hereinabove. The three wires 137 are further connected with each other so as to intersect each other in the position over the room lamp section 133, as shown in FIG. 15.

The second working line section LP2 for mounting the parts to the upper vehicle body section 24 is provided with a mechanism 150 for holding the interior units in the position corresponding to the terminal end portion of the conveyor passage Ti for conveying the interior units, as shown in FIG. 15.

The mechanism 150 for holding the interior units comprises a guide rail 151 disposed in the region over the second working line section LP2, a movable section 152 movable along the guide rail 151, a driving section 153 mounted to the movable section 152, a rod 154 to be elevated or lowered by the driving section 153, and a gripping or clamping section 155 mounted to a bottom end of the rod 154.

When the rod 154 is lowered, the gripping or clamping section 155 grips or clamps the wires 137 and the room lamp section 133 from above, in such a state that the interior unit 130 is turned upside down. As the wires 137 are gripped and then pressed downward up to the room lamp section 133 by the gripping or clamping section 155, the wires 137 are pulled toward the inside, thereby pulling the end portions of the pillar sections 132a toward the inside and leaning the end portions thereof toward the room lamp section 133.

Thereafter, the driving section 153 is driven to elevate the rod 154 and moves the movable section 152 along the guide rail 151. The movable section 152 is moved to the position over the upper vehicle body section 24 and suspended in this position, followed by lowering the rod 154 and inserting the interior unit 130 through the floor opening section K1 into the cabin section A1 of the upper vehicle body section 24 held in its reverse position. Then, the gripping or clamping section 155 releases the gripping or clamping state of the interior unit 130 which in turn is mounted to the inside of the upper vehicle body section 24.

As the gripping of the interior unit 130 by the gripping or clamping section 155 is released, the pillar sections 132a of the interior unit 130 are freed from the restriction by the wires 137 and the end portions of the pillar sections 132a are returned to their original positions due to their own elasticity, thereby permitting the pillar sections 132a to come into tight engagement with the corresponding portions of the upper vehicle body section 24.

Thereafter, the gripping or clamping section 155 is allowed to release the gripping or clamping of the room lamp section 133 and removed from the upper vehicle body section 24. The interior unit 130 is then secured to the inner side of the upper vehicle body section 24 with adhesives and screws.

As described hereinabove, the interior units can be mounted to the upper vehicle body section 24 with ease and with certainty because the interior units including the interior unit 130 are to be inserted from the top through the floor opening section K1 into the cabin section A1 while the upper vehicle body section 24 is turned with its floor opening section K1 turned upside down by the second mobile conveyor or carriage 4 and thereafter the interior units are fixed to the inner side of the upper vehicle body section 24.

Figure 17:
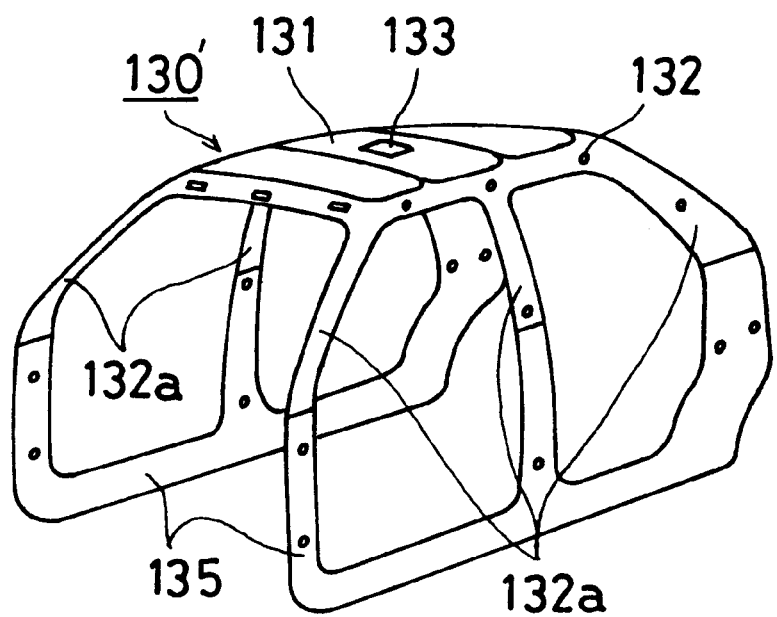
FIG. 17 is a perspective view showing another example of the cabin interior unit.

FIG. 17 shows a variant of the interior unit 130. As shown in FIG. 17, the interior unit 130' comprises a top sealing member 131 and a pillar trim member 132 with a pair of lower trim members 135 formed integrally with the foregoing members. Each of the lower trim members 135 is connected to each of the top end portions of the pillar sections 132a.

Another Example of Vehicle Body Assembly Line
(FIGS. 18 to 21)

Figure 18:
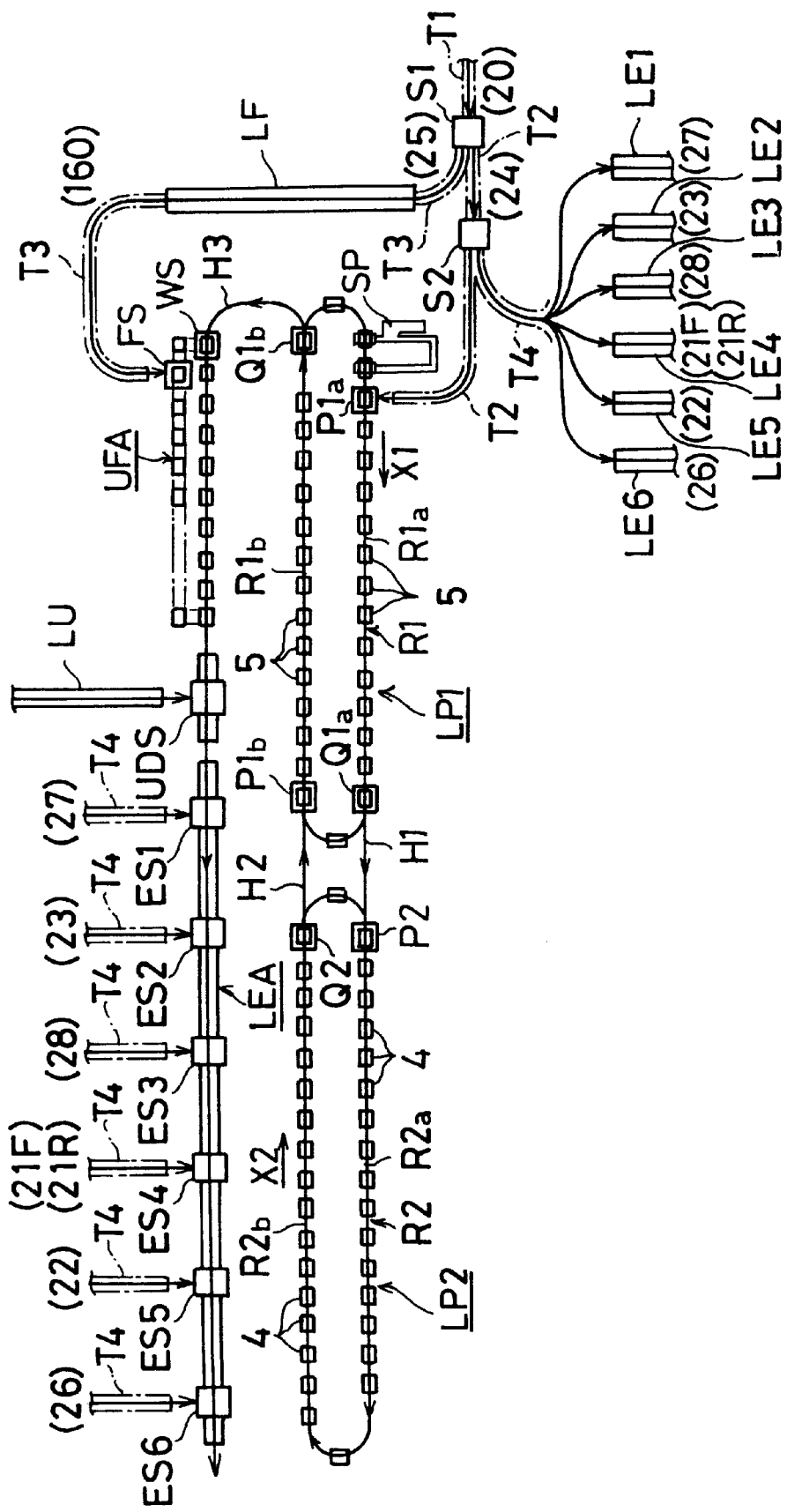
FIG. 18 is a schematic plan view showing a vehicle body assembly line according to to a further embodiment of the present invention.

In this embodiment, a third working station UDS for mounting the lower units or parts, such as the driving system parts, exhaust system parts and so on, to the assembled vehicle body section, is interposed between the working line section LFA for assembling the upper vehicle body section 24 with the floor member 25 and the working line section LEA for mounting the external parts to the resulting assembly of the upper vehicle body section 24 with the floor member 25, as shown in FIG. 18. To the third working station UDS is connected an assembly line section LU for assembling the lower units, such as the driving system parts, exhaust system parts and so on.

Figure 19:
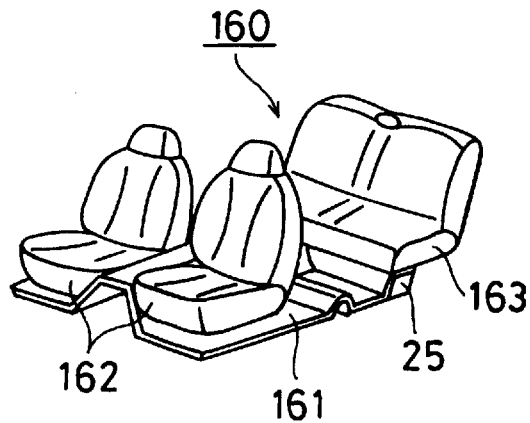
FIG. 19 is a perspective view showing a floor assembly body to be mounted to the upper vehicle body section with various parts mounted thereto.

In the line section LF for processing the floor member, the floor member 25 is subjected to processing including sealing processing, rust-resisting processing and so on. First, a floor mat is mounted on the floor of the floor member 25 as well as a front seat and a rear seat are mounted thereto, followed by mounting other interior members. FIG. 19 shows an example of a floor assembly body, as indicated by 160, in which the interior members are mounted to the floor member 25. In other words, the floor assembly body 160 is arranged in such a manner that the floor mat 161 as well as a pair of the left-hand and right-hand front seats 162 and a pair of the left-hand and right-hand rear seats 163 are mounted to the floor member 25. The floor assembly body 160 is conveyed and transferred to the working line section LFA for assembling the upper vehicle body section 24 with the floor member 25.

In the assembly line section LU for assembling the lower units or parts, an assembly body 176 is formed by assembling various units which may include, for example, an internal combustion engine 170, left-hand and right-hand front suspensions 171, left-hand and right-hand rear suspensions 172, a catalyst converter 173, a muffler 174, a propeller shaft 175 and so on. The lower assembly body 176 is to be disposed underneath the floor member 25. The lower assembly body 176 assembled into the assembly body 160 is placed on sub-pallets 181 and 182 disposed on a pallet 180 and then conveyed to the working station UDS for assembling the lower units or parts with the floor assembly body 160.

Figure 20:
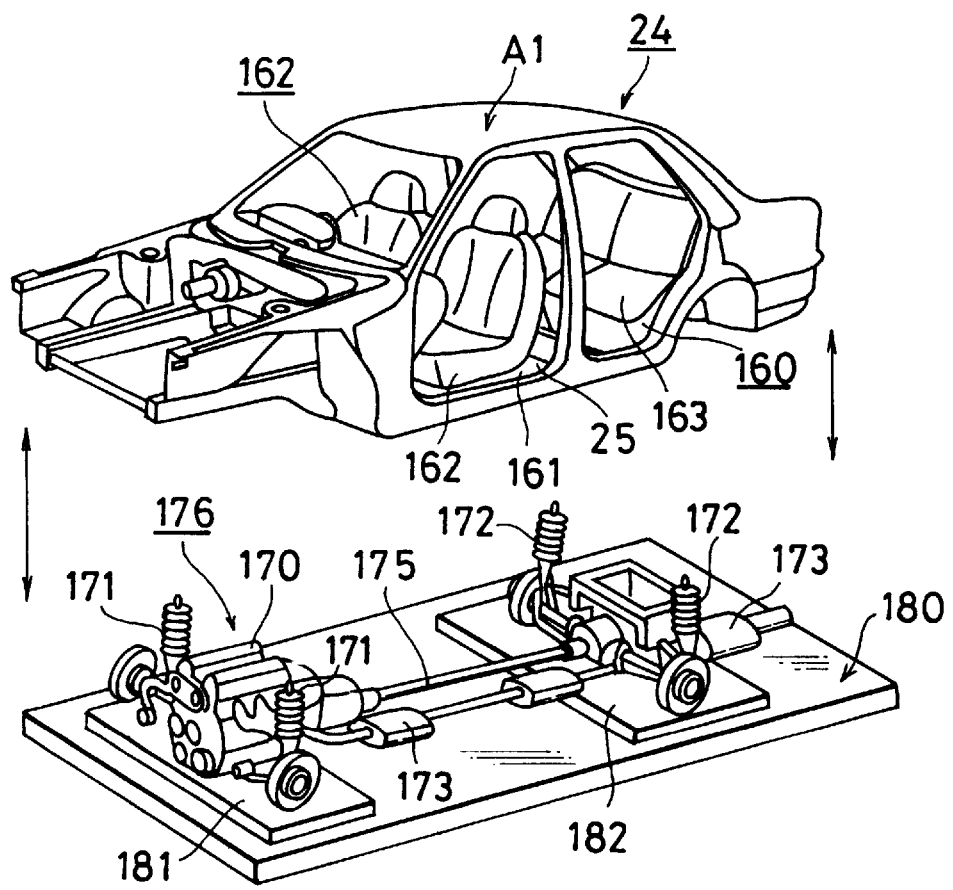
FIG. 20 is a perspective view showing the lower parts to be mounted to an assembly body with the upper vehicle body section assembled with the floor assembly body.

In the working station UDS, the lower assembly body 176 is mounted to the upper vehicle body section 24 with the floor member 25 mounted thereto, as shown in FIG. 20.

Figure 14:
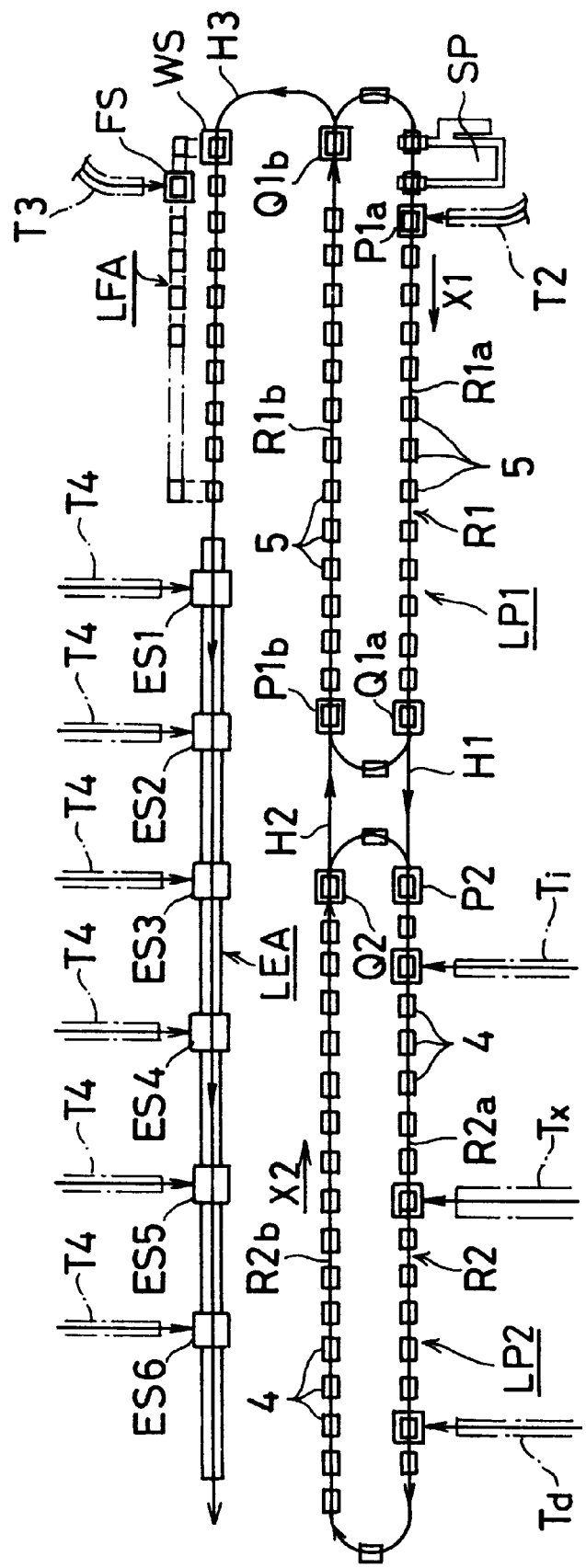
FIG. 14 is a plan view showing a vehicle body assembly line according to another embodiment of the present invention.
Figure 21:
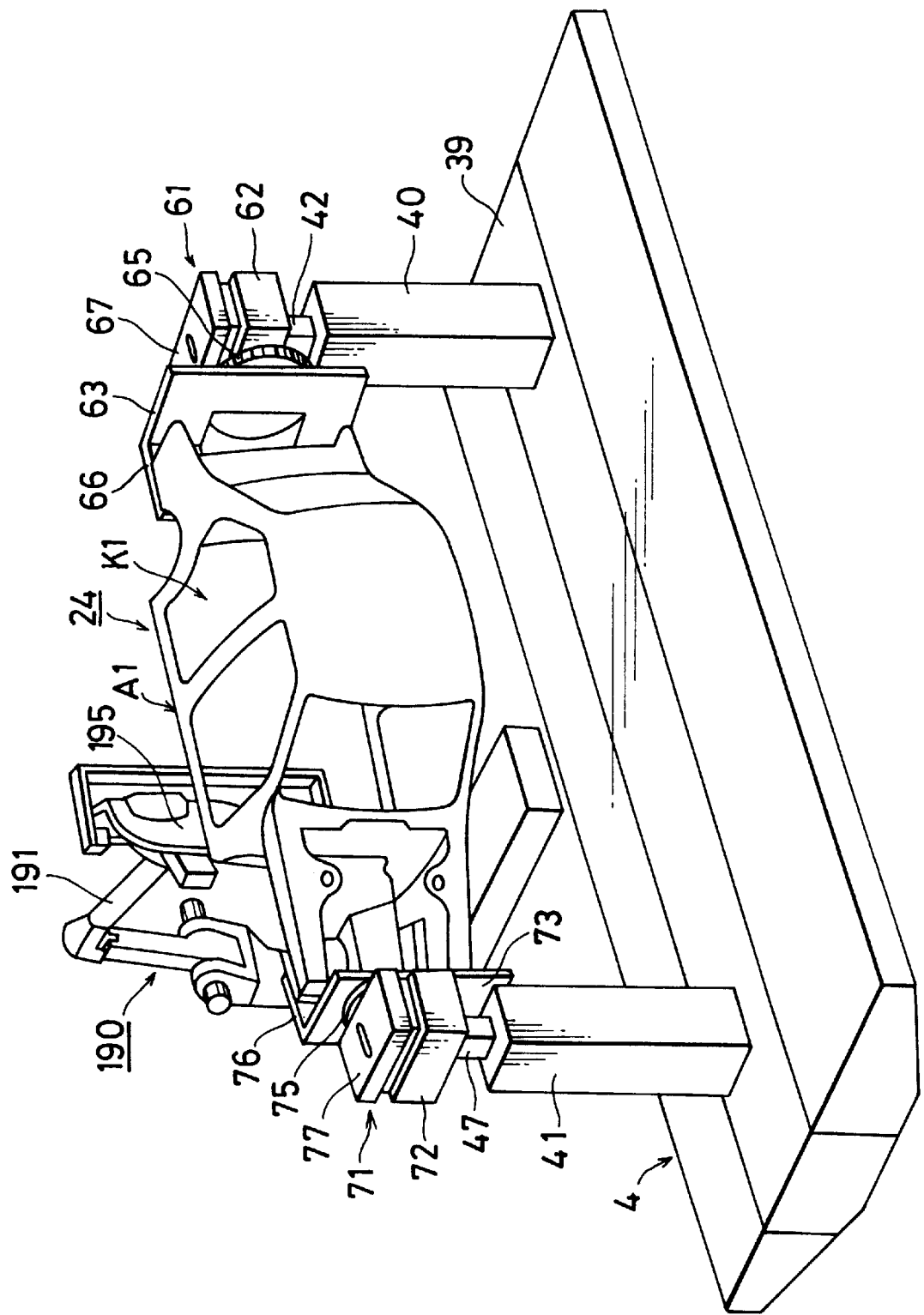
FIG. 21 is a perspective view showing the position of the upper vehicle body section loaded on the second conveyor or carriage in the position suitable for mounting an instrument panel by rotating the upper vehicle body section.

Further, the instrument panel unit 195 fed from the conveyor passage Td for conveying instrument panels, as shown in FIG. 14, is mounted to the upper vehicle body section 24 by a working robot 190, as shown in FIG. 21, which in turn is disposed in the second working line section LP2 for mounting the parts to the upper vehicle body section 24 while being conveyed with the aid of the second mobile conveyor or carriage 4.

The working robot 190 has an arm 191 which grips the unit instrument panel unit 195 supplied from the conveyor passage Td for conveying instrument panels and mounts it to the upper vehicle body section 24 loaded on the second mobile conveyor or carriage 4. During the period of time when the second mobile conveyor or carriage 4 with the upper vehicle body section 24 loaded thereon approaches the working robot 190, the upper vehicle body section 24 is turned sideways so as to direct its floor opening section K1 to the working robot 190. The arm 191 with the unit instrument panel unit 195 gripped thereby is inserted from the side through the floor opening section Kl of the upper vehicle body section 24 in the sideways position and mounts the unit instrument panel unit 195 to the inner side of the upper vehicle body section 24.

Figure 22:
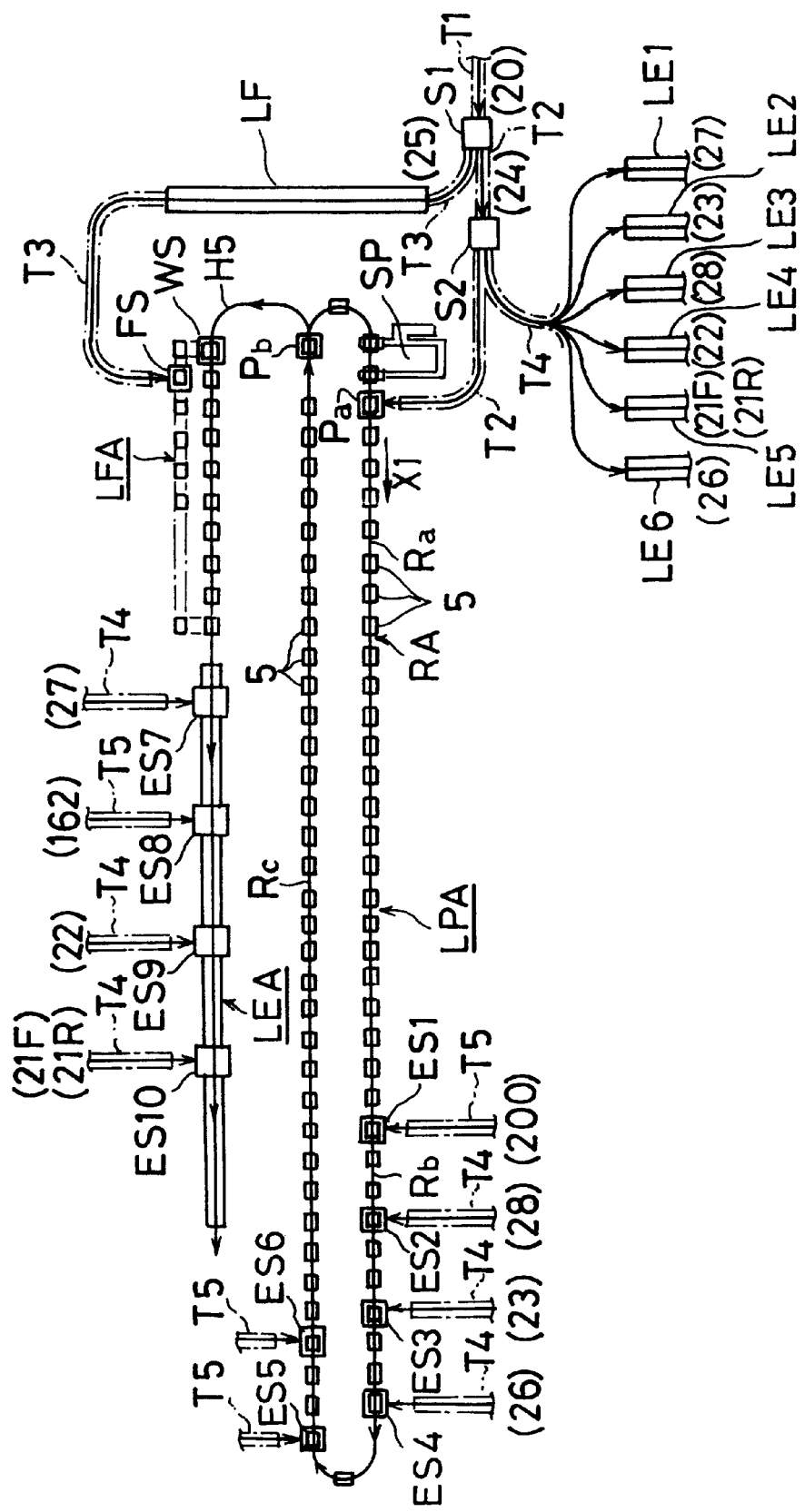
FIG. 22 is a schematic plan view showing a vehicle body assembly line according to a further embodiment of the present invention.
Figure 23:
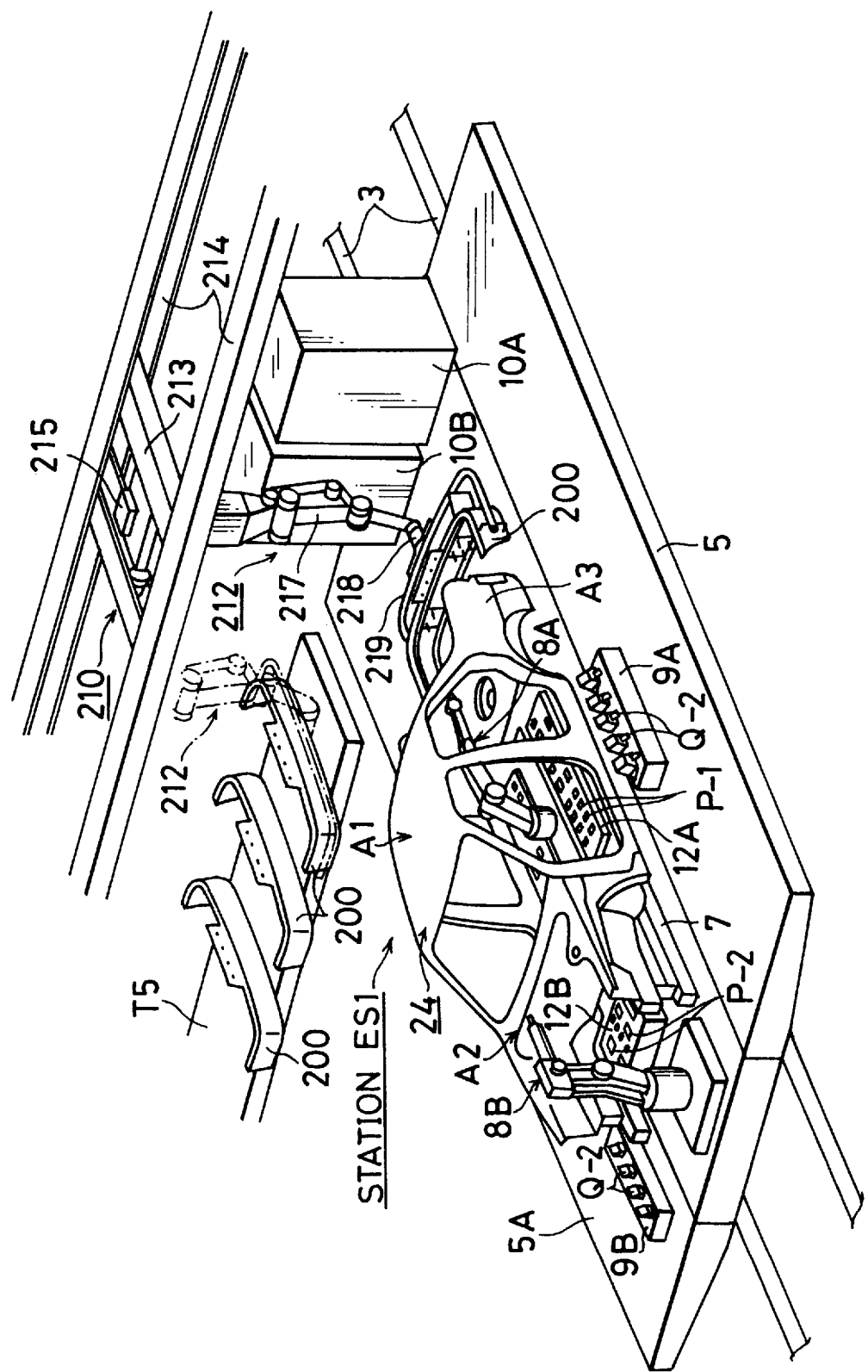
FIG. 23 is a perspective view showing the state of the operation for mounting a rear bumper and various parts with the working robot disposed on the conveyor or carriage to a rear end portion of the upper vehicle body section in a mounting station.

Further Example of Vehicle Body Assembly Line
(FIGS. 22 and 23)

In this embodiment, the vehicle body assembly line has a line LPA on and along which a plurality of the first mobile conveyors or carriages 5 are travelling and the work conveyor passage RA of the line LPA is divided into sections Ra, Rb and Rc. A start end portion of the section Ra is connected to a terminal end portion of the section Rc through a connecting line section, a terminal end portion of the section Ra is connected to a start end portion of the section Rb, and a terminal end portion of the section Rc is connected to a start end portion of the section Rc through a connecting line section. In other words, the line LPA is of a loop structure as a whole.

On the upstream side of the work transfer section Pa in the work conveyor passage line section RA, where the upper vehicle body section 24 is transferred from the second conveyor passage line T2 and loaded on the first mobile conveyor or carriage 5, is disposed a sports supply station SP for supplying parts. In the parts supply station SP, the parts P-1 and P-2 are disposed on the respective sub-pallets 12A and 12B for the first mobile conveyor or carriage 5 in predetermined positions.

To the section Rb of the work conveyor passage RA are connected terminal end portions of three conveyor passage lines T4 for supplying the exterior members and end portions of three conveyor passages T5 for supplying large mountings. Further, the terminal end portion of the section Rc of the work conveyor passage RA is connected through a hanger conveyor line H5 to the line section LFA for assembling the upper vehicle body section 24 with the floor member 25.

As shown in FIG. 22, the upper vehicle body section 24 and the floor member 25 processed in the first working station S1 are conveyed, respectively, to the second conveyor passage T2 for conveying the upper vehicle body section 24 and the third conveyor passage T3 for conveying the floor member 25. The upper vehicle body section 24 is then conveyed to the second working station S2 through the conveyor passage T2 for conveying the upper vehicle body section 24, and the floor member 25 is then conveyed to the the line section LF for processing the floor member 25 through the third conveyor passage T3 for conveying the floor member 25. In the the line section LF for processing the floor member, the floor member 25 is subjected to processing including sealing processing, rust-resisting processing and so on, and various parts are mounted to the floor member 25 in the manner as described hereinabove. Then, the floor member 25 is conveyed to the line section LFA for assembling the upper vehicle body section 24 with the floor member 25.

The first mobile conveyor or carriage 5 with the upper vehicle body section 24 loaded thereon then travels from the start end portion of the section Ra of the work conveyor passage RA toward the terminal end portion of the section Rb thereof in the direction as indicated by the arrow X in FIG. 22. In the course of travelling on and along the section Rb, a variety of small parts such as wire-harnesses, grommets, clips and so on are mounted to the upper vehicle body section 24 by the first working robot 8A and the second working robot 8B mounted to the first mobile conveyor or carriage 5, in the manner as described hereinabove.

More specifically, the following small parts are mounted to the upper vehicle body section 24 while the first mobile conveyor or carriage 5 with the upper vehicle body section 24 loaded thereon travels along the section Rb and passes through first to sixth working stations ES1 to ES6, inclusive, for mounting the small parts. The first working station ES1 is to mount a rear bumper 200 fed from the first conveyor passage T5, and the second working station ES2 is to mount a rear panel 28 which in turn has been fed from the first conveyor passage T4. To the third working station ES3 is supplied the trunk lid 23 from the second conveyor passage T4 which in turn is mounted to the upper vehicle body section 24. The fourth working station ES4 is to mount the front fender 26 to the upper vehicle body section 24, which has been fed from the third conveyor passage T4. Further, an instrument panel 195 is mounted to the upper vehicle body section 24 in the fifth working station ES5 to which the instrument panels 195 have been fed from the second conveyor passage T5. In addition, the sixth working station ES6 is to mount a rear seat to the upper vehicle body section 24 which in turn has been fed from the third conveyor passage T5.

In the course during which the first mobile conveyor or carriage 5 travels from the start end portion of the section Rc of the work conveyor passage RA toward the terminal end portion of the section Rc thereof, the various parts mounted to the upper vehicle body section 24 are fastened and the mounting operations for the upper vehicle body section 24 is finished as the first mobile conveyor or carriage 5 has reached the terminal end portion of the section Rc of the work conveyor passage RA thereof.

The upper vehicle body section 24 with the various parts mounted thereto is transferred to the hanger conveyor line H5 at the work transfer section Pa located adjacent the terminal end portion of the section Rc of the work conveyor passage RA thereof and then conveyed through the hanger conveyor line H5 to the line section LFA for assembling the upper vehicle body section 24 with the floor member 25 and then to the line section LEA for mounting the external members to the assembly of the upper vehicle body section 24 with the floor member 25, i.e. the assembled vehicle body section. In the line section LFA, the upper vehicle body section 24 transferred from the hanger conveyor line H5 is assembled with the floor member 25 transferred from the third conveyor passage T3 for conveying the floor member, and the assembled vehicle body section is then conveyed to the line section LEA for mounting the external parts to the assembled vehicle body section. To the line section LEA are disposed seventh to tenth working stations ES7 to working station ES10, inclusive.

In the seventh to tenth working stations ES7 to working station ES10, the following parts are mounted to the assembled vehicle body section composed of the upper vehicle body section 24 and the floor member 25. More particularly, the seventh working station ES7 is to mount the front shroud 27 to the upper assembly body, which in turn has been supplied from the fourth conveyor passage T4. The eighth working station ES8 is to mount the front seat 162 to the upper assembly body, which has been fed from the fourth conveyor passage T5. Further, the engine hood 22 is then mounted to the upper assembly body in the ninth working station ES9 to which the engine hood 25 has been supplied from the fifth conveyor passage T4. In addition, the tenth working station ES10 is to mount the front doors 21F and the rear doors 21R, which in turn have been fed from the sixth conveyor passage T4.

Turning back to description of the first mobile conveyor or carriage 5 travelling on and along the work conveyor passage RA of the working line section LPA, the parts P-1 and P-2 are mounted to the upper vehicle body section 24 by the first working robot 8A and the second working robot 8B mounted on the first mobile conveyor or carriage 5 during the course of the work conveyor passage RA on and along which the first mobile conveyor or carriage 5 travels. Then, the upper vehicle body section 24 reaches the first working station ES1 after the various parts P-1 and P-2 have been mounted to the upper vehicle body section 24, and the upper vehicle body section 24 is then mounted with the aforesaid various parts by the working robots disposed in each working stations working station ES1 to ES6.

The operations for mounting the various parts will be described with reference to FIG. 23 by taking the operation for mounting the rear bumper 200 in the first working station ES1 as an example.

FIG. 23 shows the first working station ES1 to which the rear bumpers 200 are fed one after another. In the first working station ES1 is disposed a working robot 212 which is operatively driven by a driving mechanism section 210 having a movable section 213. The movable section 213 is movable with a pair of guide rails 214 disposed in a region over the first working station ES1. The driving mechanism section 210 has a driving unit 215 disposed to the movable section 213 and the driving unit 215 transmits a control signal from a control unit (not shown) to the working robot 212.

As shown in FIG. 23, the working robot 212 comprises a movable arm section 217, a wrist section 218 mounted rotatably to a top end of the movable arm section 217, and a clamping tool 219 mounted to the wrist section 218.

The working robot 212 is operated on the basis of the control signals to be fed from the control unit, thereby allowing the clamping tool 219 to clamp the rear bumper 200 and release the clamping of the rear bumper 200. The movable section 213 can move between the first position as indicated by the dot-and-dash line in FIG. 23 and the second position as indicated by the solid line therein, whereby the working robot 212 is allowed to move between the first position and the second position. Further, the working robot 212 is allowed to be elevated or lowered, as needed.

In the first working station ES1, the movable section 213 is first moved to the first position and allows the clamping tool 219 of the working robot 212 to clamp the rear bumper 200 fed from the first conveyor passage T5. Then, the working robot 212 is moved from the first position to the second position while the clamping tool 219 clamps the rear bumper 200, as the first mobile conveyor or carriage 5 reaches the first working station ES1. The working robot 212 is operated in its first position to allow the movable arm section 217 to face the rear bumper 200 toward the rear end portion of the upper vehicle body section 24 loaded on the first mobile conveyor or carriage 5. Then, the movable arm section 217 is operated to allow the wrist section 218 to approach the rear end portion of the upper vehicle body section 24 and fix the rear bumper 200 into the upper vehicle body section 24. The rear bumper 200 is then released from the wrist section 218 and the wrist section 218 of the working robot 212 is pulled back. The working robot 212 is then moved from the second position to the first position for mounting the rear bumper 200 to a new upper vehicle body section 24 entering thereafter into the first working station ES1.

In the second to sixth working stations ES2 to ES6, which follow the first working station working station ES1, are disposed working robots having the structures substantially identical and similar to the working robot 212 disposed in the first working station ES1. By operating such working robots in substantially the same manner as described immediately hereinabove for mounting the rear bumper 200 in the first working station ES1, the various parts are mounted to the upper vehicle body section 24 in the corresponding working stations ES2 to ES6, inclusive, after the upper vehicle body section 24 has been processed as required. In other words, the rear panel 28 is mounted with the working robot to the upper vehicle body section 24 in the second working station ES2 after the necessary processing has been implemented, and the trunk lid 23 is mounted thereto with the working robot in the third working station ES3 after the upper vehicle body section 24 has been processed. Further, after it has been subjected to necessary processing, the front fender 26 is mounted thereto with the working robot in the fourth working station ES4. In addition, the instrument panel 195 is mounted thereto with the working robot in the fifth working station ES5 after the processing of the instrument panel 195 has been finished. Furthermore, in the sixth working station ES6, the rear seats are mounted to the upper vehicle body section 24 after they are subjected to necessary processing.

It is to be noted, in this embodiment, that large parts such as the rear bumper 200 and so on can be mounted to the upper vehicle body section 24 by mounting means, e.g. the working robot 212, disposed in the first to sixth working stations ES1 to ES6 of the work conveyor passage RA, so that the upper vehicle body section 24 is not required to be transferred from the first mobile conveyor or carriage 5 to another conveyor or carriage for mounting the large parts. This can assist shorten the working time required for mounting the large parts to a great extent because conventionally the large parts have been mounted to the upper vehicle body section 24 transferred from one conveyor or carriage to another.

What is claimed is:

1. A method for the assembly of a work in a vehicle body assembly line having at least one of a conveyor and a carriage loaded on a guide rail disposed along the vehicle body assembly line, comprising:

mounting the work so as to be supported by a work-supporting means and then aligned by a work-aligning means on said at least one conveyor and carriage;

loading said at least one conveyor and carriage with a plurality of parts;

loading said at least one conveyor and carriage with a plurality of tools;

assembling a part to the work with a part-assembly robot disposed on said at least one conveyor and carriage during a period of time during which the said at least one conveyor and carriage moves and the work is mounted to the said at least one conveyor and carriage wherein the part is clamped with the part-assembly robot from a pallet disposed on at least one of a conveyor and carriage;

changing the tools of the part-assembly robot in accordance with the parts to be mounted to the work; and releasing the work from said at least one conveyor and carriage after the assembly of the part with the work by the part-assembly robot.

2. A method for the assembly of a work as claimed in claim 1, further comprising:

providing said at least one conveyor and carriage with a control unit for controlling the part-assembly robot; and storing operating data in the control unit for operating the part-assembly robot and controlling the part-assembly robot on the basis of the operating data stored therein.

3. A method for the assembly of a work as claimed in claim 2, further comprising:

simultaneously mounting the parts to a plurality of works; and entering the operating data in accordance with the plurality of works into the control unit prior to the start of running said at least one conveyor and carriage.

4. A method for the assembly of a vehicle body section of an automotive vehicle in a vehicle body assembly line having at least one of a conveyor and a carriage loaded on a guide rail disposed along the vehicle body assembly line, comprising:

separating the vehicle body section by removing a floor section and a door therefrom prior to mounting said vehicle body section on said at least one conveyor and carriage;

mounting the vehicle body section so as to be supported by a vehicle body section-supporting means and then aligned by a vehicle body section-aligning means on said at least one conveyor and carriage;

locating a working robot within a cabin section of the vehicle body section;

assembling a part to the vehicle body section with the part-assembly robot disposed on said at least one conveyor and carriage during a period of time during which the said at least one conveyor and carriage moves and the vehicle body section is mounted to the said at least one conveyor and carriage, wherein the part is clamped with the part-assembly robot from a pallet disposed on at least one of a conveyor and carriage; and releasing the vehicle body section from said at least one conveyor and carriage after the assembly of the part with the vehicle body section by the part-assembly robot.

5. A method for the assembly of a vehicle body section as claimed in claim 4, wherein said step of assembling includes assembling parts comprising small parts including a grommet, a wire-harness, a fastener and a clip.

6. A method for the assembly of a vehicle body section of an automotive vehicle in a vehicle body assembly line having at least one of a conveyor and a carriage loaded on a guide rail disposed along the vehicle body assembly line, comprising:

separating the vehicle body section by removing an engine hood and a shroud panel therefrom prior to mounting said vehicle body section on said at least one conveyor and carriage;

mounting the vehicle body section so as to be supported by a vehicle body section-supporting means and then aligned by a vehicle body section-aligning means on said at least one conveyor and carriage;

disposing a working robot in a position in front of or directed toward an engine room section of the vehicle body section;

assembling a part to the vehicle body section with a part-assembly robot disposed on said at least one conveyor and carriage during a period of time during which the said at least one conveyor and carriage moves and the vehicle body section is mounted to the said at least one conveyor and carriage, wherein the part is clamped with the part-assembly robot from a pallet disposed on at least one of a conveyor and carriage; and releasing the vehicle body section from said at least one conveyor and carriage after the assembly of the part with the vehicle body section by the part-assembly robot.

7. A method for the assembly of a vehicle body section as claimed in claim 6, wherein said step of assembling includes assembling parts comprising small parts including a grommet, a wire-harness, a fastener and a clip.

* * * * *